US009118501B2

(12) United States Patent  
Darland et al.

(10) Patent No.: US 9,118,501 B2  
(45) Date of Patent: *Aug. 25, 2015

(54) INTELLIGENT SERVICES NETWORK USING A SWITCH CONTROLLER

(75) Inventors: Timothy Darland, Cedar Rapids, IA (US); Daniel W. Foelker, Milwaukee, WI (US); George Kult, Fairfield, IA (US); Sharadha Vijay, Cedar Rapids, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/049,616

(22) Filed: Mar. 16, 2011

(65) Prior Publication Data

US 2011/0164743 A1     Jul. 7, 2011

Related U.S. Application Data

(63) Continuation of application No. 09/096,936, filed on Jun. 12, 1998, now Pat. No. 7,929,516.

(51) Int. Cl.  
*H04L 12/28*     (2006.01)  
*H04Q 3/00*     (2006.01)

(52) U.S. Cl.  
CPC ........ *H04L 12/2874* (2013.01); *H04L 12/2856* (2013.01); *H04Q 3/0054* (2013.01)

(58) Field of Classification Search  
CPC . H04L 12/2856; H04L 12/2874; H04L 12/66; H04Q 3/0054  
USPC .......................... 370/352–356, 363, 364, 386; 379/15.01, 15.02, 16, 17  
See application file for complete search history.

(56) References Cited

U.S. PATENT DOCUMENTS 5,668,861 A * 9/1997 Watts ........................ 379/215.01  
6,097,801 A * 8/2000 Williams et al. .......... 379/221.13  
6,134,235 A * 10/2000 Goldman et al. ............. 370/352

* cited by examiner

*Primary Examiner* — Pao Sinkantarakorn

(57) ABSTRACT

The present invention is an intelligent services network that uses a switch controller. The switch controller controls the operation of one or more programmable switches to accept calls from a public switched telephone network. The intelligent service network comprises intelligent service network components that are used for enhanced service processing, interconnection to external networks, and other call functions. Communication between the components allows for call set-up, connection to a terminating party, transfer to an alternate intelligent service network component, and termination of the call.

17 Claims, 15 Drawing Sheets

ISN with Multiple Programmable Switches

ISN with Bridging Programmable Switch

INTELLIGENT SERVICES NETWORK USING A SWITCH CONTROLLER

BACKGROUND OF THE INVENTION

1. Field of the Invention

The present invention relates generally to telecommunications network processing of services.

2. Related Art

Telecommunications network products are services provided by telephone companies that are carried on telecommunications networks. A widely known example is dial-1 long distance voice service which allows a customer to dial a 1 plus a ten digit number from his or her home telephone, talk to a party who answers the telephone on the line of the ten digit number dialed, and pay for the telephone call when billed at the end of the month.

Although dial-1 is popular, other calling and payment options, also referred to as enhanced services, are sometimes preferable. For example, debit calling allows an individual to make a call from a phone other than their home phone and charge the call to the debit account. With debit calling, also referred to as prepaid calling, a customer puts funds in an account and has those funds debited each time a telephone call is made. Another calling and payment option is collect calling in which the call is billed to the receiving party's account. However, enhanced services are not limited to other calling and payment options. Enhanced services can provide a customer with information such as access to news and weather. Another enhanced service is 1-800-MUSICNOW which gives a telephone caller the ability to select and listen to music and then order a recording of the music by entering selections in response to menu prompts using the keypad of the telephone.

Enhanced services are possible because intelligent services networks (ISNs) within telephone companies telecommunications networks have advanced capabilities needed to process the enhanced service calls. Much of the advanced capability is provided by two particular components within the intelligent service network, the automatic call distributor (ACD) which provides the call switching and queuing functions and the intelligent service network applications processor (ISNAP) which provides monitoring and control of queued calls for the ISN.

Unfortunately, ACDs are typically only available with the capacity to handle a large call volume. In addition, ACDs are generally very expensive. Because the ACD is generally expensive, the ACD typically determines the size and capacity of an ISN. Many smaller sized telecommunications carriers and private entities desire to employ ISN capability, but do not have sufficient call volumes to justify the expense of a traditional large-scale ACD. The ISN architectures that are available today cannot be scaled to the appropriate port capacity for small or moderate call volumes. This prohibits both small and large companies from utilizing ISNs where they are commonly needed. Although smaller switches are available, they are not capable of performing many ACD functions needed for enhanced services.

Another problem encountered with a large-scale ACD-based ISN is the development cost and cycle of ACDs. Often the deployment of new services for the ISN or enhancement to existing services on the ISN require modifications to the ACD. The ISN service provider must subject itself to the ACD vendor's development costs and time.

SUMMARY OF THE INVENTION

The present invention is directed to an intelligent services network (ISN) that uses a switch controller. In addition to the switch controller, the ISN comprises programmable switches which interface the ISN to the public telephone switch network (PSTN). The programmable switches are connected to the switch controller which is interconnected to a WAN/LAN network connecting various ISN components used for enhanced service call processing and other functions. The ISN components interface with callers and other networks to provide enhanced service functionality such as menu driven services and access to data and services of other networks. In addition. ISN components include a force management system, a system management system, and a user interface for switch configuration and system management which assist in the retrieval of statistical data on ISN components and allow configuration of ISN components, such as the programmable switches.

The switch controller controls the operation of one or more programmable switches which provide switching functionality between the telecommunications network and components on the ISN. The switch controller performs many functions traditionally performed by automated call distributors (ACDs) including call routing and call queuing. However, unlike ACDs, service logic programs within the switch controller provide these functions. Service logic programs provide greater efficiency and allow the switch controller to be easily upgraded to handle new enhanced services. The switch controller also performs the functions traditionally performed by the intelligent service network applications processor (ISNAP) including monitoring and control of queued calls. In addition, the switch controller performs other functions needed for enhanced service call processing, such as functions needed for prepaid call processing. Furthermore, the switch controller provides an interface to other components on the ISN that provide interface with callers and other networks to provide enhanced service functionality and access to data and services of other networks.

Use of switch controllers and programmable switches in place of ACDs allows an ISN to be scaled to an appropriate port capacity for the entity desiring to provide enhanced telecommunications services. To scale an ISN to a needed port capacity, programmable switch ports can be added or removed without having to modify the switch controller or add more switch controllers. In addition, switching functions for remote programmable switches can be controlled by the switch controller. This allows a programmable switch at one ISN to be connected to a programmable switch at another ISN. Interconnection between programmable switches enables one ISN to automatically backup another ISN. An ISN can receive calls from another ISN without call transfer over the public switched telephone network.

A scalable ISN architecture allows small service providers to deploy an ISN that suits their needs. It also allows any service provider to deploy ISNs in a greater number of locations, such as in foreign countries, where a large-scale ISN may not be economically practical. Also, as the volume of traffic handled by an ISN grows, additional programmable switches may be added at marginal expense. To expand the capacity of an ACD-based ISN, a second ACD would be needed which is extremely expensive and often prohibitive. Even if a high call volume ISN is desired, an ISN with a switch controller and programmable switches can be implemented with the same capacity as an ISN with an ACD at a significantly lower cost.

An additional benefit of implementing an ISN using a switch controller and programmable switches is that because the switch controller uses service logic programs to provide enhanced services, the switch controller can be easily upgraded to handle new enhanced services. As a result, development time and costs are reduced.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE FIGURES

DETAILED DESCRIPTION OF THE PREFERRED EMBODIMENTS 1.0 Exemplary Intelligent Service Network Interface Environment FIG. 1 is a block diagram of an intelligent service network (ISN) environment 102 according to one embodiment of the present iCDRnvention. The switch controllers 112 within the ISNs 108 provide access for a call initiated via PSTN 106 to ISN components 116a, 116b, ... 116n (116) also within ISNs 108. Switch controllers 112 are described in further detail in copending U.S. patent application Ser. No. 09/096,938, now U.S. Pat. No. 6,480,597, entitled, "Switch Controller" incorporated herein by reference. Except as otherwise noted, when elements of the ISNs 108 are referred to generally, they will be referred to with a number designation and not a letter designation.

Figure 1:
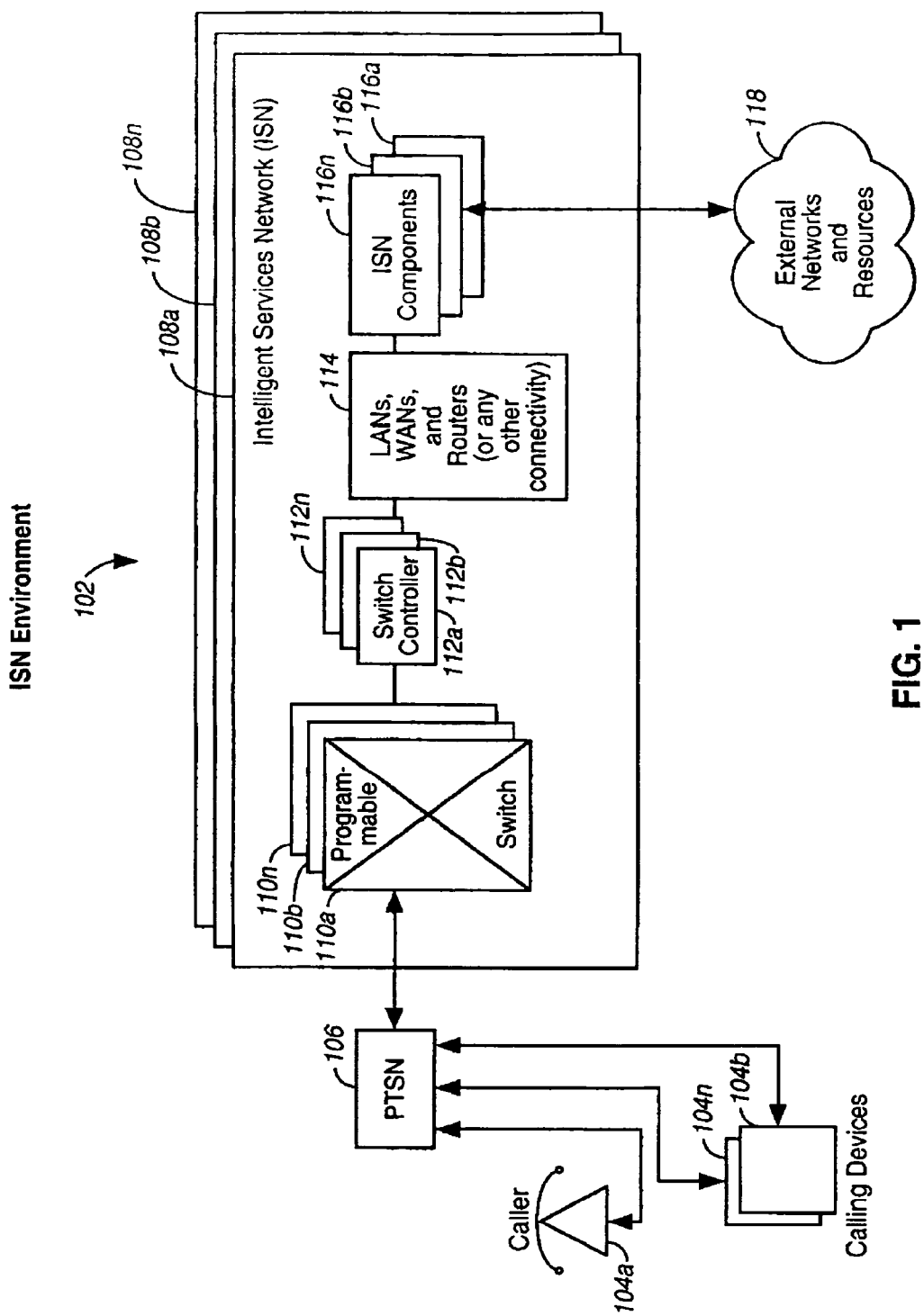
FIG. 1 is a block diagram of an intelligent services network environment according to one embodiment of the present invention.

The ISN environment 102 includes one or more calling devices 104a, 104b, ... 104n (104), such as a telephone, used by a caller, a public switch telephone network (PSTN) 106, one or more ISNs 108a, 108b, ... 108n, and external networks and resources 118. The telephone 104 used by the caller is connected to PSTN 106. The PSTN 106 provides switching and connectivity to the ISNs 108. The ISNs 108 may provide enhanced service functionality, network integration, and other functions. The ISN component 116B is an exemplary ISN component 116 that is connected to external networks and resources 118. External networks and resources 118 include financial processors, information databases, and Internet facilities. In addition to providing connectivity to external networks and resources 118, the ISN components 116 provide enhanced service call processing. Exemplary enhanced services include manual operator service, prepaid calling, calling card, 1-800-COLLECT, and 1-800-MUSIC-NOW.

The ISNs 108 include one or more programmable switches 110a, 110b, ... 110n, one or more switch controllers 112a, 112b ... 112n, LANs, WANs, and routers (or any other connectivity) 114, and ISN components 116. The programmable switches 110 are connected to the PSTN 106 to provide switching capabilities for access between the PSTN 106 and the ISNs 108. The switch controllers 112 are interconnected to programmable switches 110 to provide commands to control the programmable switches 110. Local Area Networks, WANs, and routers (or any other connectivity) 114 are connected to switch controllers 112 and the ISN components 116 to provide connectivity between the switch controllers 112 and the ISN components 116. Exemplary ISN components 116 include manual operator consoles (MOCs), automated response units (ARUs), databases, and protocol converters. The MOCs and ARUs are personal computers (PCs) that interact with a caller to provide operator services, customer services, and other enhanced services. Databases include stored information and may be a single database or multiple databases connected to and controlled by a server system. Protocol converters are connected to external networks and resources 118 and provide protocol conversion and other processing necessary for interface between the PSTN 106 and external networks and resources 118. The ISN components 116 will be described in further detail with respect to FIG. 2.

The ISN environment 102 can best be described referencing the processing of a typical call. The exemplary call will be for a service that requires human operator intervention. The call is placed by a caller using a calling device 104A. Calling devices 104 are any devices that can place or receive a call. Exemplary calling devices 104 include telephones, facsimile machines, and personal computers.

The call is received by PSTN 106. The PSTN 106 comprises multiple telecommunications networks including local exchange networks and interexchange networks. A local exchange network comprises switches and termination equipment within a localized area. An example of a local exchange network is a local telephone operating company network, such as Bell Atlantic. An interexchange network comprises a plurality of switches, also referred to as exchanges, distributed throughout a geographic area large enough to process long distance telephone calls. For example, a national interexchange network comprises switches located throughout the nation. When the call is routed to either a local exchange network or an interexchange network, the call is routed to one or more switches within the network.

The PSTN 106 is interconnected to a programmable switch 110A within an ISN 108A. Programmable switches 110 have basic switching matrices that provide switching functionality for access to ISNs 108. An ISN 108A may include one or more programmable switches 110 interconnected to one switch controller 112A or to additional switch controllers 112B-112n. Configurations of ISNs are illustrated in more detail with respect to FIGS. 13-15. Programmable switches 110 are dumb switches that can connect ports and process calls based on external commands. Examples of programmable switches 110 include those built by Excel and Summa Four. Excel programmable switches 110 come in sizes ranging from 512 ports to 8,000 ports.

The ISN 108a has a sizable architecture because the number of programmable switches 110 and the configuration of the programmable switches 110 can vary depending on the desired port requirement of the ISN 108a. Programmable switches 110 manufactured by Excel can support various signaling systems such as Signaling System Number 7 (SS7) and can be connected directly to the signaling network of a PSTN 106. If multiple programmable switches 110 are interconnected to one or more switch controllers 112, connections between the programmable switches 110 and the switch controllers 112 may be via a LAN (not shown), such as an Ethernet LAN, using transmission control protocol/internet protocol (TCP/IP). Transmission control protocol/internet protocol is used by various data networks including many Internet servers.

Each of the programmable switches 110 is connected to the PSTN 106 via voice telephony trunks, also referred to as lines. Typical telephony trunks are capable of carrying high speed digital data.

The voice trunk connectivity between the programmable switches 110 and the PSTN 106 includes equipment that provides signaling functionality. Equipment within telecommunications networks send signals to each other to communicate information for call processing, such as the origination and destination information, current state of the call processing, equipment being used for the processing, etc. Even if equipment is in-service, if it is incapable of signaling to other equipment, it cannot be used for call processing. Because of the importance of signaling to call processing, sophisticated signaling techniques are used, such as signaling system number 7 (SS7) protocol. Specialized equipment within the telecommunications network (not shown) provides SS7 functionality. Signaling system number 7 may be implemented using Token ring LANs (not shown) connected to a signal transfer point (not shown). If the programmable switch is not capable of SS7 signaling or other signaling used by the PSTN 106, the ISN 108 architectures may include a signaling gateway between the signaling transfer point and the programmable switches 110 to facilitate in conversion between the signaling used by the programmable switches 110 and the signaling used by the PSTN 106. The current industry standard of SS7 protocol is published in the International Telecommunications Union (ITU) Signaling System Number 7 (SS7) Integrated Services Digital Network (ISDN) User Part (ISUP) NCT1.113 (1995) document and the International Telecommunications Union (ITU) Signaling System 7 (SS7) Message Transfer Part (MTP) NCT1.111 (1992) document which are incorporated herein by reference in their entirety.

Exemplary switch controller 112a is connected to programmable switches 110 to provide external commands to control call processing. The switch controller 112a provides the commands to exemplary programmable switch 110a carrying the exemplary call to perform call processing functions. When the programmable switch 110a receives the call from the network it sends a message to the switch controller 112a. The switch controller 112a determines the call processing needed and returns commands to the programmable switch 110a.

In addition, the switch controller 112a provides access to ISN components 116. The switch controller interfaces with ISN components 116 via LANs, WANs, routers (or any other connectivity) 114 using network information distribution system (NIDS) sequenced packet protocol (NSPP) on top of user datagram protocol/internet protocol (UDP/IP). Network information distribution system sequenced packet protocol is a session oriented packet exchange protocol that is implemented over UDP/IP. It is designed to allow rapid information exchange between client applications and NIDS server processes. The use of TCP/IP between switch controller 112A and the programmable switch 110A and the use of NSPP/UDP/IP for communications via LANs, WANs, routers (or any other connectivity) 114 illustrate exemplary protocols but communication is not limited to these protocols.

The ISN components 116 include components that provide enhanced service functionality and connectivity to external networks and sources 118. ISN components 116 will be described in further detail with respect to FIG. 2.

Figure 2:
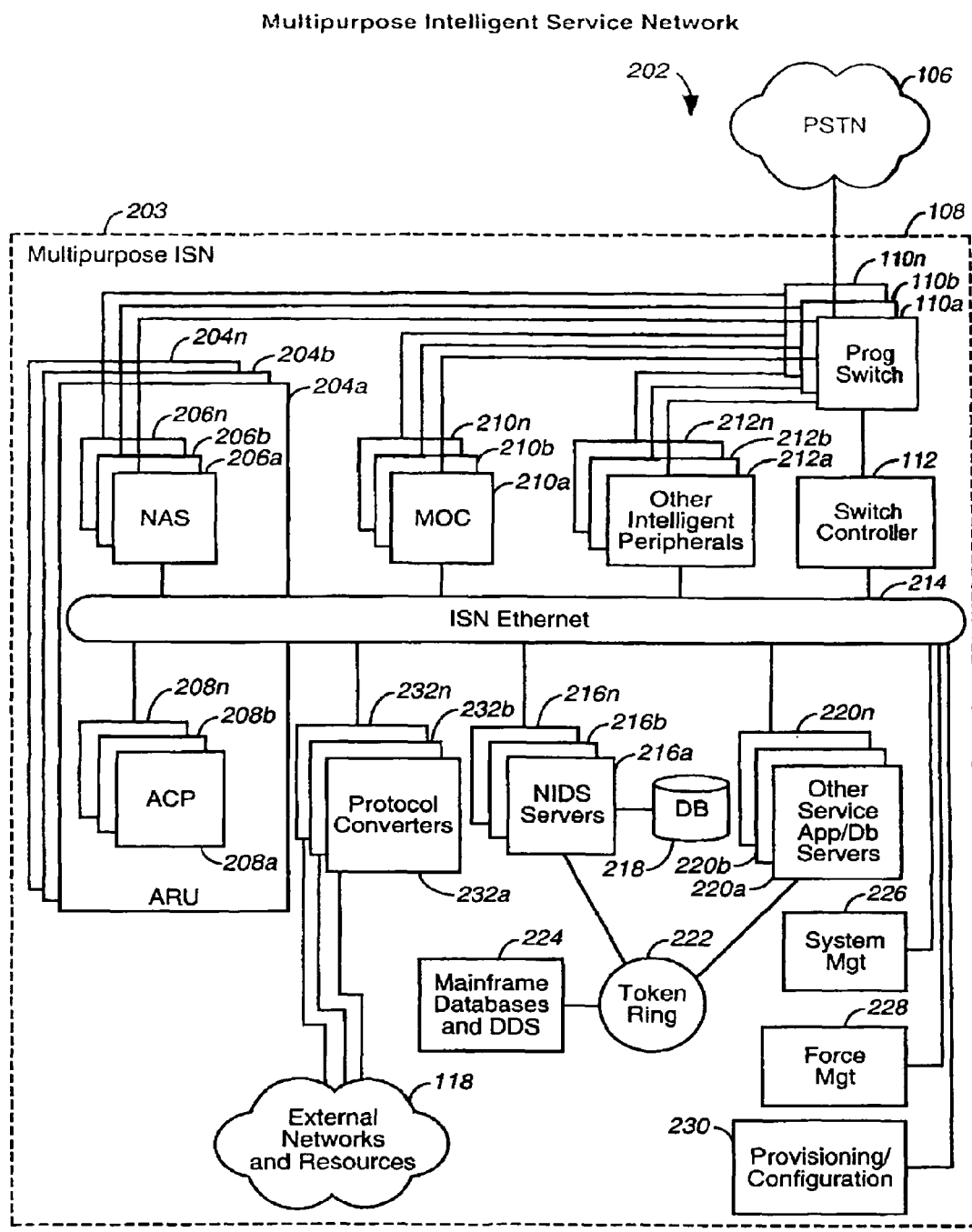
FIG. 2 is a block diagram of a multipurpose intelligent service network according to one embodiment of the present invention.

FIG. 2 is a block diagram 202 of a multipurpose ISN 203. The ISNs 108 may used to perform various functions depending on the ISN components 116 included in the ISNs 108. The multipurpose ISN 203 illustrates exemplary ISN components 116 that may be included in ISNs 108. The combination of ISN components 116 of the multipurpose ISN 203 allow the multipurpose ISN 203 to perform multiple functions.

The multipurpose ISN 203 includes one or more programmable switches 110a, 110b . . . 110n (110) that are interconnected to the PSTN 106. The programmable switches 110 are interconnected to the switch controller 112A. The switch controller 112A is connected to the ISN Ethernet LAN 214 which is one embodiment of LANs, WANs, and routers (or any other connectivity) 114. Except as otherwise noted, when elements of the multipurpose ISN 203 are referred to generally, they will be referred to with a number designation and not a letter designation.

Connected to both the programmable switches 110 and the ISN Ethernet LAN 214 are intelligent peripherals including manual operator consoles (MOCs) 210a, 210b, . . . 210n (210), automated response units (ARUs) 204a, 204b, . . . 204n, and other intelligent peripherals 212a, 212b, . . . 212n (212). The MOCs 210 are PC workstations that are operated by live operators or call center agents to provide operator services, customer services, and other enhanced services requiring human operator intervention. The MOCs 210 are housed in an Operator Network Center (ONC) (not shown). An ONC is a site that houses the MOCs 210. The ONC may be physically remote from the other components of the multipurpose ISN 203. The MOCs 210 are connected to a distinct ONC LAN which is also an Ethernet LAN. The ONC LAN and the ISN Ethernet LAN 214 are connected via routers, and essentially operate as a single LAN, shown as the ISN Ethernet LAN 214 in FIG. 2. The ONC LAN also includes various servers for system monitoring, booting (system initialization), and other applications.

The ARUs 204 are comprised of network audio servers (NASs) 206a, 206b, . . . 206n and automated call processors (ACPs) 208a, 208b, . . . 208n. The ARUs 204 are used to provide automated operator services and interactive voice response services. The ACPs 208a, 208b, . . . 208n (208) are high performance personal or midrange computers that perform intelligent application processing to determine which services to provide. The NASs 206a, 206b, 206n (206) are specialized computers equipped with telephony ports which provide audio responses and collect caller input via dual tone multifrequency (DTMF) signals and voice recognition based on commands provided by the ACP 208. The ACPs 208 communicate with the NASs 206 via LANs, WANs, and routers (or any other connectivity) 114. Each ARU 204 and MOC 210 is connected to one or more programmable switches 110 via voice trunks. Both MOCs 210 and ARUs 204 are also referred to as agents. Other intelligent peripherals 212a, 212b, . . . 212n (212) can be used in an ISN to provide various call services. Other intelligent peripherals 212 are also connected to one or more programmable switches 110 via voice trunks.

Additional examples of ISN components 116 are NIDS servers 216a, 216b, 216n (216) and the NIDS database 218. The NIDS servers 216 are connected to the ISN Ethernet LAN 214 and to the NIDS database 218. A NIDS database 218 stores data related to call processing such as customer accounts and routing translations. When an ISN component116, such as an ARU 204 or a MOC 210, receives a call, it may query a NIDS server 216 via the ISN Ethernet LAN 214 for data stored in the NIDS database 218. In addition, NIDS servers 216 receive data from mainframe-based systems 224 to be used during real time call processing. Mainframe databases and a data distribution system (DDS) 224 are connected to a token ring LAN 222. The token ring LAN 222 is connected to the NIDS servers 216. Order entry and data management functions are performed within mainframe based systems 224. Mainframe computers are used as the databases of record for call processing data. The DDSs distribute call processing data stored in mainframe computers over a token ring LAN 222 to each NIDS server 216. In addition, other service application database servers 220a, 220b, . . . 220n (220) are connected to the ISN Ethernet LAN 214 and to the token ring 222. An exemplary other service application database server 220 is a server to process prepaid calls.

The ISN components 116 also include protocol converters 232a, 232b. 232n that convert between various telecommunications protocols. Protocol converters 232 provide protocol conversion between different protocols such as TCP/IP, NSPP on top of UDP/IP, and packet switching protocols, such as X.25. Exemplary components that perform protocol conversion are the advanced intelligent network gateway (AIN) described in U.S. patent application Ser. No. 08/967,339, now U.S. Pat. No. 6,229,819, entitled, "Advanced Intelligent Network Gateway" and the validation gateway described in U.S. patent application Ser. No. 08/956,220, now U.S. Pat. No. 6,160,874, entitled, "Validation Gateway," incorporated herein by reference. Both components are described in more detail with respect to FIG. 3. The capabilities of the components described in the previously referenced applications are not limited by the examples given and are defined by the scope of the claims in the applications.

Protocol converters 232 are connected to external networks and resources 118. Exemplary external networks and resources 118 include financial processors with credit card information, the Internet, and other databases, such as those used in processing international calls.

Additional ISN components 116 include computers for system management 226, force management 228, and provisioning/configuration 230. Each of these systems may be implemented on a different computer, such as a PC workstation, as is shown in FIG. 2. Alternately, they can be embodied on the same computer workstation, and can even be the same process and GUI. System management 226 includes system monitoring of the switch controller 112A and the programmable switches 110, collection of alarms, call state monitoring, call state triggering, resource monitoring, and resource state triggering. Force management 228 is the management and monitoring of a ONC's work force (i.e. agents). Provisioning and configuration 230 includes the provisioning and configuration of programmable switch resources 110 (i.e. ports), ARU 204, MOC 210, and other intelligent peripheral 212 resources, and other resources. Computers that perform system management 226, force management 228, and provisioning/configuration 230, are connected to the ISN Ethernet LAN 214. This provides an interface to the switch controller 112.

Additional information concerning ISN components 116 is provided in copending U.S. patent application Ser. No. 08/956,232, now U.S. Pat. No. 6,188,761, entitled, "A System and Method for Providing Operator and Customer Services for Intelligent Overlay Networks," incorporated herein by reference.

Figure 3A:
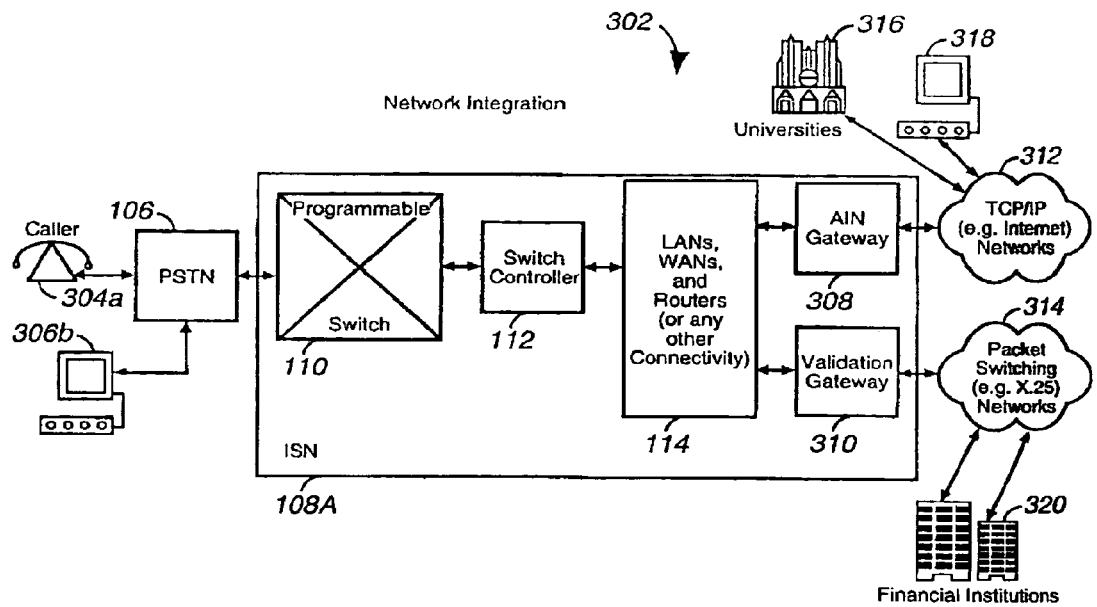
FIG. 3A is a block diagram of intelligent service network functionality for network integration according to one embodiment of the present invention.
Figure 3B:
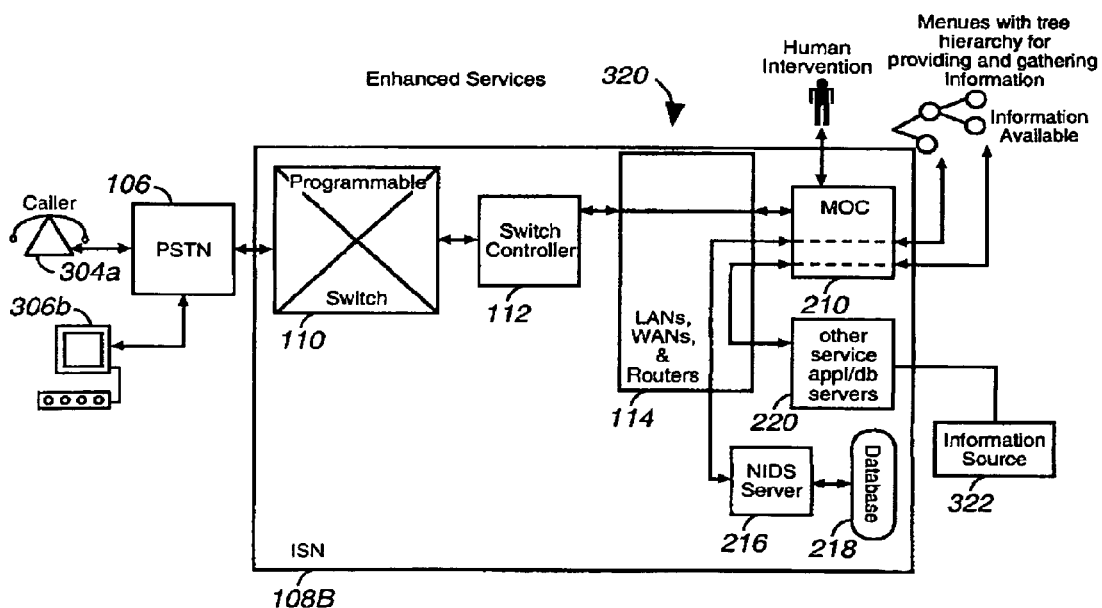
FIG. 3B is a block diagram of intelligent service network functionality for enhanced services according to one embodiment of the present invention.

FIGS. 3A and 3B are block diagrams illustrating ISN network integration functionality 302 and ISN enhanced service functionality 320. The ISNs 108 serve multiple purposes. An ISN 108 may integrate various networks so that a caller calling via a telephone network can communicate with someone using an Internet service, a database of a financial institution, or any other network. In addition, an ISN 108 could be used to reconnect to the PSTN 106 or to another telephone network. An ISN 108 may also be used to provide enhanced services such as pre-paid service, calling card, operator service, 1-800-COLLECT, and 1-800-MUSICNOW. The functionality of an ISN 108 is dependent on the ISN components 116 included on the ISN 108.

A significant feature of an ISN 108 is that the ISN 108 provides telephony circuit connections from the PSTN 106 to other networks and/or components that provide enhanced services. The programmable switch 110 of the ISN 108 is connected to telephony circuits capable of carrying voice traffic from the PSTN 106 to the ISN 108. The programmable switch 110 processes calls by following commands provided by the switch controller 112. A caller may call in using a telephone 304a, a personal computer 306a, or any device that may be used to place a call. Calls transmit via telephony transmission lines within the PSTN 106 as do other calls. The PSTN 106 switches calls to be processed by ISN 108 to the programmable switch 110. The PSTN 106 may be a PSTN 106 in any country or region or in multiple countries or regions.

The switch controller 112 commands the programmable switch 110 to send the calls to the appropriate ISN component 116 (shown in FIG. 1). Intelligent Service Network integration functionality 302 involves the use of protocol converters 232 (shown in FIG. 2) to perform protocol conversion needed to interface two networks. A protocol is a standard that computer programs follow to be compatible with other computer programs. Protocols determine what information is transmitted, what timing values should be associated with the transfer of information, and what format should be used to transmit the information.

The ISN network integration functionality 302 is provided by interconnecting an exemplary ISN 108A via protocol converters 232 to other networks. Two exemplary protocol converters are the AIN gateway 308 and the validation gateway 310 described in the above-referenced applications. The AIN gateway 308 is interconnected to TCP/IP networks 312, such as the Internet. The validation gateway 310 is interconnected to packet switching networks 314, such as X.25 networks. A caller placing a call via telephony circuits of the PSTN 106 using telephone 304a, personal computer 306a, or any other calling device may interconnect to an individual using a personal computer on the internet 318, a university database 316, or any other internet network element via the AIN gateway 308 on ISN 108A. The caller, again placing a call via telephony circuits of the PSTN 106 using telephone 304a, personal computer 306a, or any other calling device may interconnect to the database of a financial institution 320 or any other database on a packet switching network 314 such as the X.25 network. The capabilities of the AIN gateway 308 and the validation gateway 310 are not limited by the examples given and are defined by the scope of the claims in the previously referenced applications U.S. patent application Ser. No. 08/967,339, now U.S. Pat. No. 6,229,819 and U.S. patent application Ser. No. 08/956,220, now U.S. Pat. No. 6,160,874

The ISN enhanced service functionality 320 is provided by ISN components 116 that perform enhanced service call processing functions, such as MOCs 210 and ARUs 204. The MOCs 210 and ARUs 204 allow interaction with a caller. The MOCs 210 provide information to a human operator to process a call received by a caller. The ARUs 204 provide menu selections and receive inputs entered into a telephone keypad, personal computer or voice responses. Both MOCs 210 and ARUs 204 interface with a caller to provide and receive information. In addition. MOCs 210 and ARUs 204 are interconnected to other ISN components 116, such as other application database servers 220 that access other information sources 322 and the NIDS server 216 that accesses the NIDS database 218. Access to the applications database servers 220 and NIDS server 216 provides access to the data stored in the information sources 322 and NIDS database 220 respectively. This information is used to process an enhanced service call. Exemplary data includes services to which a customer subscribes. A MOC 210 and an ARU 204 use the exemplary data to provide via a screen read by a human operator and a voice recording, respectively, the optional enhanced services from which a customer may choose. Other ISN components 116 are available that provide caller interaction functionality, such as a switch service control point (not shown). In addition, other ISN components 116 are available that provide information and other enhanced voice service functionality.

Also, network integration may be used to provide enhanced service functionality. For example, a MOC 210 may access a validation gateway 310 to gain information from a database in a financial institution 320 to allow a person to use a credit card to purchase additional calling time on a prepaid service account.

Figure 4:
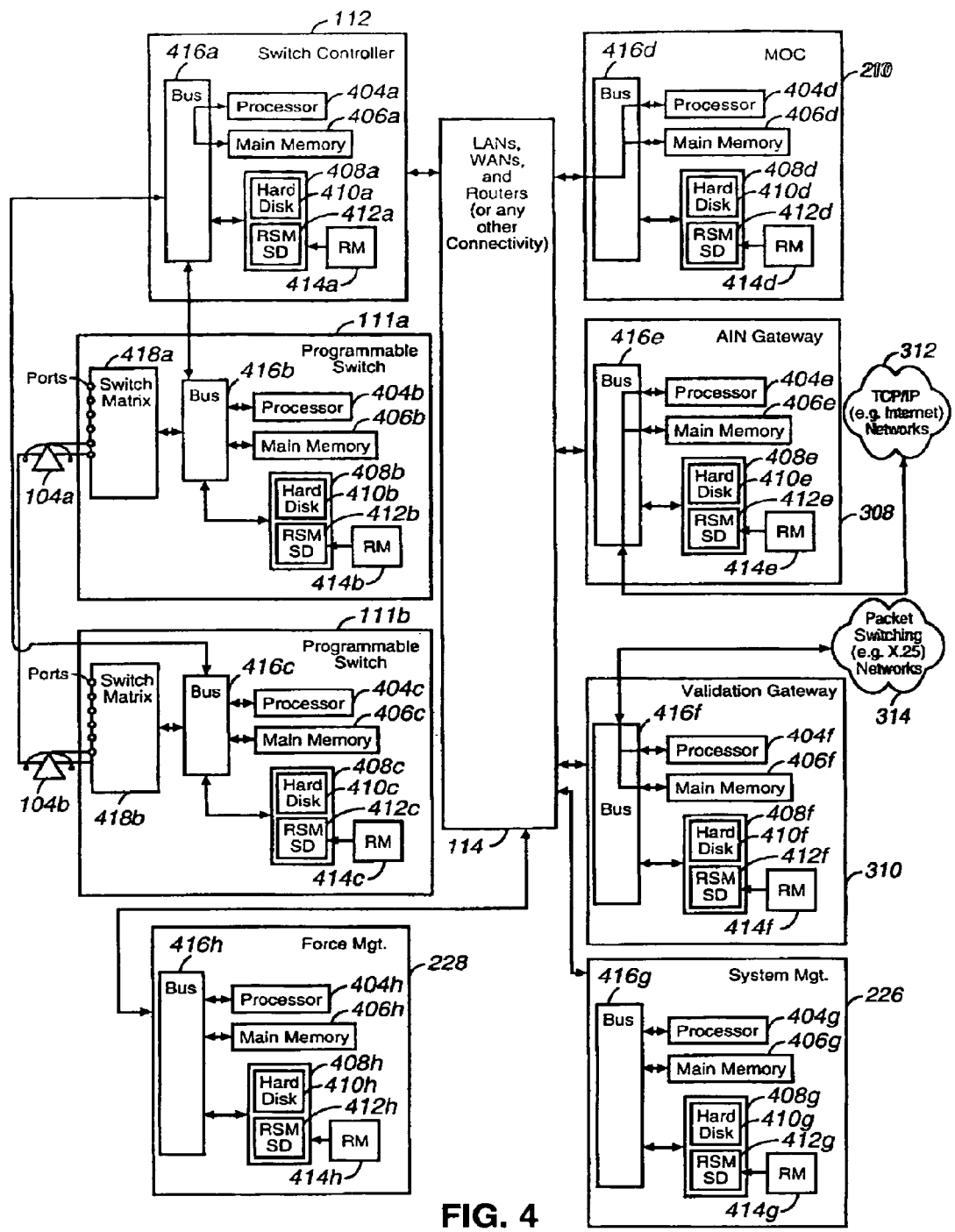
FIG. 4 is a block diagram of a hardware configuration of an intelligent service network according to one embodiment of the present invention.

FIG. 4 is a block diagram of the hardware configuration of an ISN 108. The switch controller 112, programmable switches 110, and ISN components 116 of the present invention are preferably implemented using computer systems as shown in FIG. 4. A computer system includes one or more processors, such as processors 404a, 404b, 404c, 404d, 404e, 404f, 404g, 404h ... 404n (404) connected to bus 416a, 416b, 416c, 416d, 416e, 416f, 416g, 416h ... 416n (416). Also connected to bus 416 is main memory 406a, 406b, 406c. 406d, 406e, 406f, 406g, 406h ... 406n (406) (preferably random access memory, RAM) and secondary storage devices 408a, 408b, 408c, 408d, 408e, 408f, 408g, 408h ... 408n (408). The secondary storage devices 408 include, for example, a hard drive 410a, 410b. 410c, 410d, 410e, 410f. 410g, 410h ... 410n (410) and a removable storage medium drive 414a, 414b, 414c, 414d, 414e, 414f, 414g, 414h ... 414n (414) (such as a disk drive, for example).

The application programs of these components are preferably computer programs that reside in main memory 406 while executing. When executing, the computer programs enable the computer system to perform the features of the present invention as discussed herein. Thus, the application program represents a controller of the computer system (and of the processor 404). Alternately, the application program is predominately or entirely a hardware device, such as a hardware state machine.

In one embodiment, the present invention is a computer program product (such as removable storage medium 414, representing a computer storage disk, compact disk, etc.) comprising a computer readable media having control logic recorded thereon. The control logic, when loaded into main memory 406 and executed by processor 404, enables the processor 404 to perform the operations described herein.

Figure 5:
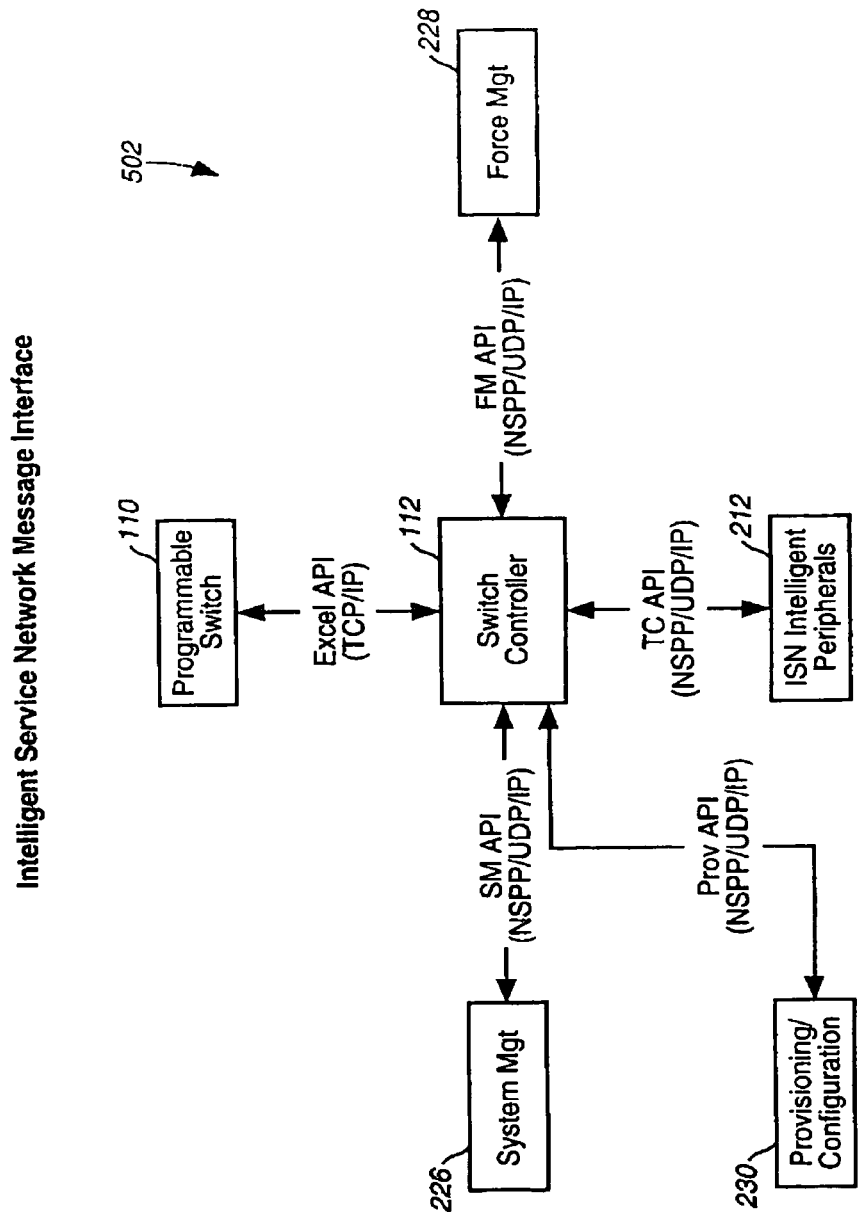
FIG. 5 is a block diagram of an intelligent service network message interface according to one embodiment of the present invention.

FIG. 5 is a block diagram of the ISN message interface 502. The ISN message interface 502 illustrates the external interfaces of the switch controller 112. The switch controller 112 communicates with the programmable switch 110 via TCP/IP over either a direct cable connection or a LAN (not shown). The switch controller sends messages in an application programmer interface (API) messaging format that is specified by the programmable switch 110 vendor. For example, if an Excel programmable switch is used, then an Excel API is used. The Excel programmable switch API is described in a document entitled, "Excel API specification revision 5.0."

The programmable switch 110 uses ISUP messaging in communications with the PSTN 106. The ISUP messaging is part of SS7, and references a layer of SS7 messaging used to perform ISN type services. The current industry standard of SS7 protocol is published in the International Telecommunications Union (ITU) Signaling System Number 7 (SS7) Integrated Services Digital Network (ISDN) User Part (ISUP) NCT 1.113 (1995) document and the International Telecommunications Union (ITU) Signaling System 7 (SS7) Message Transfer Part (MTP) NCT 1.111 (1992) document which are referenced above. The ISUP messages are used to trigger call state changes which are used to set-up a call. The switch controller 112 controls functions needed for call set-up including performing call processing and allocating facilities, such as programmable switch 110 channels and ports and ISN components 116.

The switch controller 112 communicates with each ISN component 116 via NSPP/UDP/IP over the ISN Ethernet LAN 214. The NSPP messaging is used to implement an API referred to as transmission control (TC) messaging. The TC messages include messages needed for communication between the switch controller 112 and the various ISN components 116 to handle a call. For example, for a switch controller 112 to route a call to a particular ARU 204 port, the switch controller 112 sends a "Call Offered" TC message to that ARU 204. The messages that are part of the TC API are included in the table below.

TABLE 1

TC Messages

| TC Message | Message initiating component → message reviewing component | Description |
| --- | --- | --- |
| TC_Call Offered | Switch Controller → MTOC/ACP | New Call offered to the platform |
| TC_Release | MTOC/ACP → Switch Controller | To release a call leg |
| TC_Conference | MTOC/ACP → Switch Controller | Conference in a terminating party |
| TC_Call Park | MTOC/ACP → Switch Controller | Park an active call and start call park time |
| TC_Count | MTOC/ACP → Switch Controller | Connect an originator and terminator and drop off operator |
| TC_Logon | MTOC/ACP → Switch Controller | Logon an Operator |
| TC_Layoff | MTOC/ACP → Switch Controller | Logoff an operator |
| TC_Update | MTOC/ACP → Switch Controller | Update status of Operator (Ready/Not Ready) |
| TC_On_Hold | MTOC → Switch Controller | Hold the specified leg (on and off hold) |
| TC_Off_Hold | MTOC → Switch Controller | Take a leg off hold |
| TC_Answer | Switch/Controller → ACP/MTOC | Answer indication from the terminating party |
| TC_Observe | Supervisor Console → Switch Controller | To observe a specific operator |

The Switch Controller communicates with system management 226 via NSPP/UDP/IP over the ISN Ethernet LAN 214. A system management (SM) API is used for messaging. Either a customized protocol or a simple network management protocol (SNMP), which is an industry standard messaging protocol for network management, may be used.

The switch controller 112 communicates with force management 228 via NSPP/UDP/IP over the ISN Ethernet LAN 214. A force management (FM) API that is specified by the vendor of the force management system 228 is used for messaging. Force management receives a download of statistical and historical agent information through the interface and uses the information to monitor and manage the agent population supported by the switch controller 112.

Figure 6:
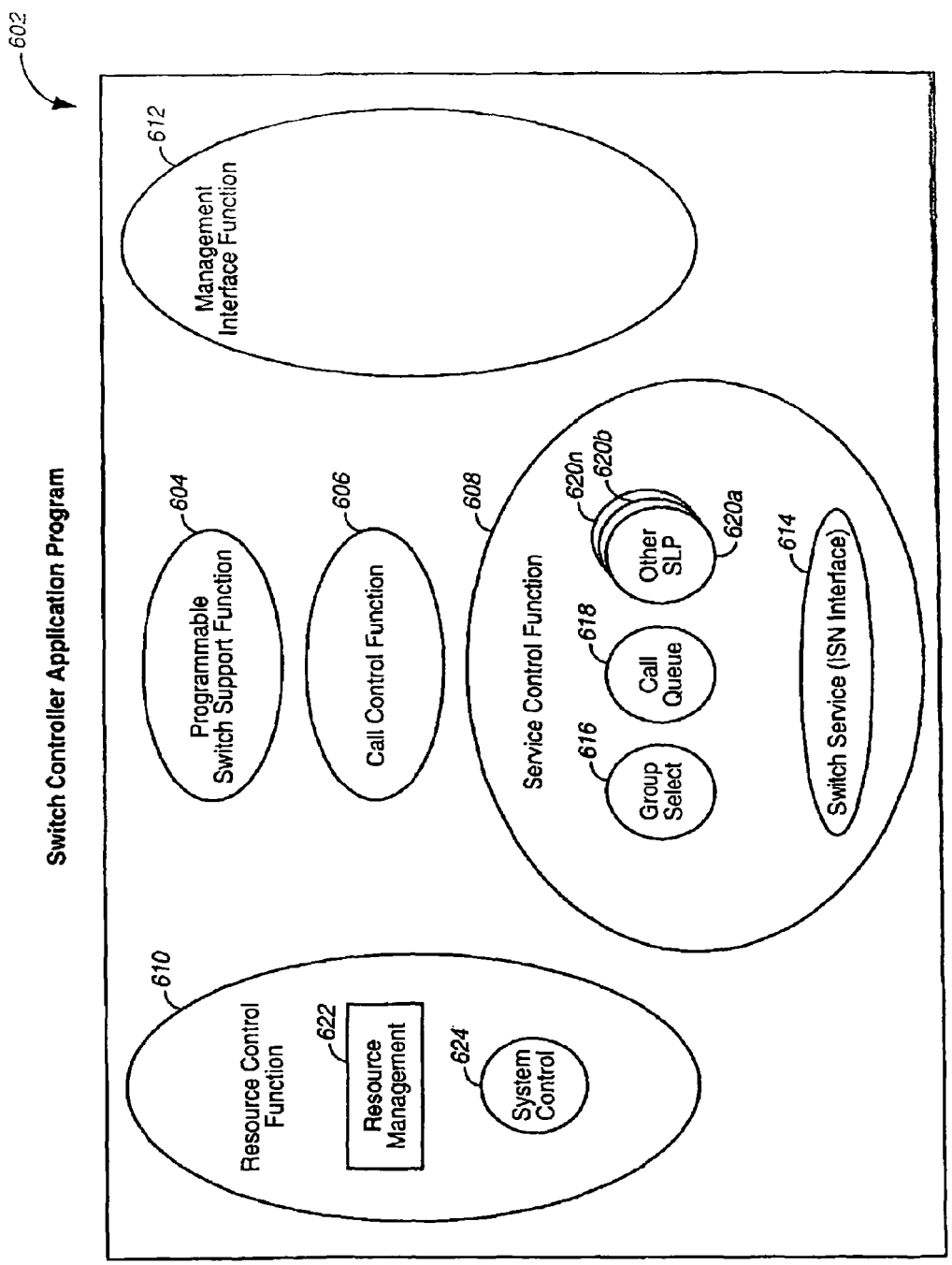
FIG. 6 is a block diagram of a switch controller application program according to one embodiment of the present invention.

FIG. 6 is a block diagram of switch controller application program 602. The switch controller application program 602 resides in memory of the switch controller 112. The switch controller application program 602 may reside in main memory 406a or in a secondary memory device 408a such as the hard disk 410a or the removable medium 414a. The switch controller application program 602 resides in memory while executing. The control logic of the switch controller application program 602 is executed by processor 406a.

The switch controller application program 602 comprises multiple routines. Software routines, also referred to as functions and processes, are elements of a computer program or application program. Software routines are sub-sets of a computer program or application program, such as groups of lines of code, that perform one or more functions. The software routines within the switch controller application program 602 form the computer software code of the switch controller application program 602 and reside in memory while executing. Software routines are processed by processor 404a during processing of the switch controller application program 602.

The software routines of the switch controller are categorized into five functions: programmable switch support function 604, call control function 606, service control function 608, resource control function 610, and management interface function 612.

The programmable switch support function 604 provides an interface between the switch controller 112A and the programmable switch 110A. The programmable switch support function 604 translates messages between a generic switch controller SCAPI message format and programmable switch API message format, manages message header/trailer requirements, and controls connectivity to the programmable switch 110. The generic switch controller SCAPI message format is the messaging among the routines of the switch controller application program 602 within the switch controller 112. The SCAPI messaging is described in further detail in U.S. patent application Ser. No. 09/096,937, now U.S. Pat. No. 6,587,890, entitled, "Switch Controller Application Programmer Interface," incorporated by reference herein. The programmable switch support function 604 also hides the switch-specific interface details, such as API message framing, checksum, retries, sequence numbers. In addition, the programmable switch support function 604 encodes and decodes the matrix specific message set; extracts call processing information from the messages; encodes/decodes the messages in the generic Switch Controller API (SCAPI) format before passing them to the call control function 606. The programmable switch support function 604 also monitors the health of the switch interface and passes the alarms generated on this interface to the appropriate routines within the Switch Controller. The programmable switch support function 604 implements logic that is required for successful communication with the programmable switch 110.

The call control function 606 provides service independent call processing. The call state machine is designed generically and is not service specific. Service specific features are handled by the service control function. The call control function 606 includes a call state machine and a signaling protocol state machine. The call control function 606 call state machine is used for call processing and performs call processing by analyzing call processing information with respect to the current state as defined by the basic call state machine model. The BCSM includes call states and events. Each call has two states represented in the state machine for the originating and terminating call segments. The basic call state machine model is described further in the International Telecommunications Union (ITU) specifications Q.1224, http://www.itu.ch/itudoc/itu-t/rec/q/q1000up/q1218.html incorporated by reference herein. The call control function 606 performs various functions including but not limited to: detecting an incoming call, creating an originating call model, collecting originating dial digits, requesting analysis of the digits, selecting trunk groups, creating a terminating call model, composing and sending messages to the terminating agent or party, detecting ISUP messages, detecting disconnect signals, and triggering enhanced services.

The call control function 606 communicates with SCAPI messages to trigger features and services from the service control function 608. The call control function 606 allocates a region of memory, referred to as a call data block. The call data block is used as a transient data store for all data on a call. The call control function 606 then processes the call through the call state machine, which implements the basic call state model.

The signaling protocol state machine manages the states of resources used for calls, such as programmable switch ports, trunks, and intelligent peripheral ports. State transitions are triggered by ISUP messages received from the network and from TC messages received from ISN intelligent peripherals.

As with the call state machine, the call control function 606 has separate instances of the protocol state machine for each resource, such as a programmable switch trunk. The protocol state machines are resource specific. A call state machine interacts with multiple protocol state machines to control a call.

The service control function 608 provides an interface to the ISN components 116 and one or more service logic programs that provide enhanced service call processing. The service control function 608 is made up of the switch service process 614 and service logic programs including group select 616, call queuing 618, and other service logic programs 620a, 620b, . . . 620n. A switch service process 614 provides an interface with the ISN components 116.

The use of service-specific service logic programs within the service control function 608 enables service-specific features for each call. The service logic program design allows switch controllers 112 to be flexible because new services can be added by simply adding a service logic program.

Based on TC messages received from an Intelligent Peripheral or SCAPI messages received from Call Control, switch service may call on various SLPs to perform specific tasks. The SLPs include a group select SLP 616, a call queue SLP 618, and various other service-oriented SLPs, such as the prepaid SLP 620 used to provide prepaid call services.

The group select SLP 616 routes calls to intelligent peripherals. Programmable switch 110 ports are grouped by the type and application of intelligent peripheral to which the port terminates. When a call requires a certain intelligent peripheral, the switch controller 112 selects the port group of that intelligent peripheral type, and sends a command to the programmable switch 110 which routes the call to the first available port in that group. The group select SLP 616 service control switch controller 214 of application program 602 selects a programmable switch 110 port group, to which to route a call, based on a dialed number translation and other criteria.

There is also a call queue SLP 618, used to queue calls on the programmable switch 110. The call queue SLP determines the port group to which the call should be routed. If the call queue SLP does not have ports available in that group, the call queue SLP 618, which sends commands to the programmable switch 110 via the programmable switch support function 210 to queue the call which is to hold the call and perhaps apply treatment (i.e., play music). The call queue SLP 618 generates the commands needed to hold the call in queue on the programmable switch 110, determines call treatment, determines how long a call should be in the queue, determines when a queued call should be dropped, and determines if a queued call should be transferred.

The resource control function 208 includes two processes. The first is the system control process 624, which is in charge of monitoring the states of a call and service-related resources. This system control process 624 is centrally aware of the resource state and general health of the switch controller. The second is the resource management process 622. Exemplary switch controller resource management functionality includes management of both system-related resources such as message queues and a call data block table, as well as network resources such as the programmable switch matrices and agent resources. The resource management process 622 is described in further detail in copending U.S. patent application Ser. No. 09/096,939 entitled, "A System and Method for Resource Management" referenced above.

The management interface function 216 includes two functional areas of monitoring control. The system monitoring functionality encompasses the generation of system alarms which allows a system management console to monitor the status and run-time operation of the switch controller software. The management interface function 216 also includes the process manager, which is responsible for initial startup and health of individual processes which make up the switch controller 112. In addition, the management interface function 216 provides interfaces to the external management systems, including the system management system 226, the force management system 228, and the provisioning/configuration system 230.

All of the routines within the switch controller application program 602 will be described in further detail in U.S. patent application Ser. No. 09/096,938, now U.S. Pat. No. 6,480, 597, referenced above.

Figure 7:
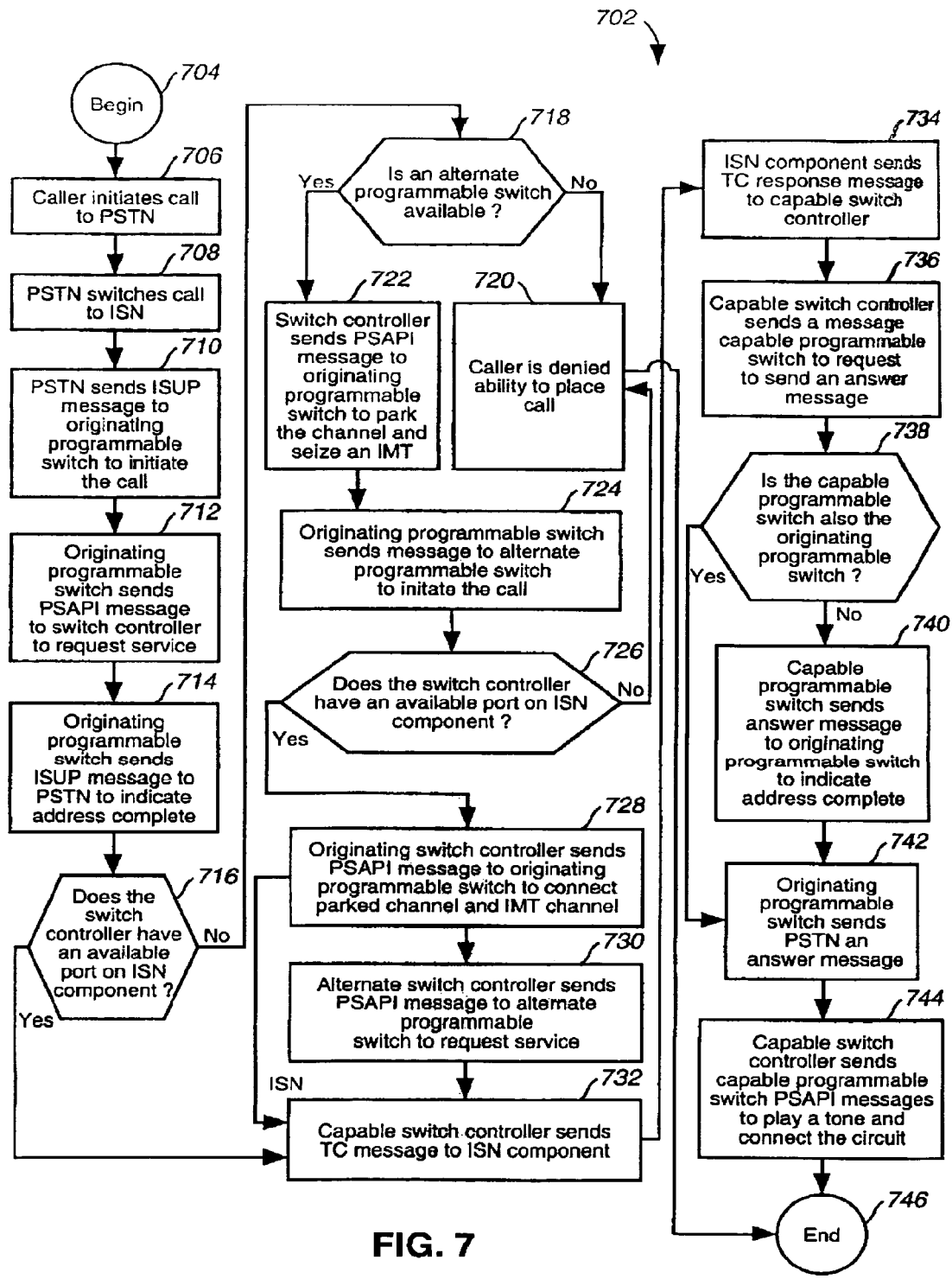
FIG. 7 is a flowchart of an intelligent service network call set-up flow according to one embodiment of the present invention.

FIG. 7 illustrates a flowchart of ISN call set-up 702. The ISN call set-up is used to establish a call between a calling device 104 and an ISN 108. The process of setting up a call involves sending messages between telecommunications components to establish a circuit between the calling device 104 and an ISN component 116. Because ISN components 116, such as ARUs 204, MOCs 210, perform varying functions, the circuit established between the calling device 104 and the ISN component 116 must be established to a type of ISN component 116 that is capable of handing the service that the caller chooses. For example, if a caller wants to speak with a human operator, the caller must be connected to a MOC 210. The messages used in setting up the call include the information needed to indicate that a MOC 210 is needed to process a call and the information needed to establish a connection with a MOC 210. In addition, messages used to set-up a call provide information needed to identify the customer, identify a service selected by the customer, and any other information needed to process the customer's call.

The steps for performing call set-up to an ISN are described below with respect to an exemplary call using exemplary equipment.

In step 706, the caller initiates a call to PSTN 106. The caller initiates a call using exemplary calling device 104a.

In step 708, the PSTN 106 switches the call to ISN 108a. The switches within the PSTN 106 route the call via telephony trunks to ISN 108a. The switches may use information provided by the caller, such as the dialed number. For example, a customer may dial an access number which, when analyzed by a switch in the PSTN 106, indicates that the call should be sent to the ISN 108a. The calling device 104a may send the information to the PSTN 106 to indicate that the call should be sent to ISN 108a. For example, if a customer uses a payphone with intelligence, such as a smartphone, the phone may send information indicating that the call should be sent to ISN 108a.

In step 710, the PSTN 106 sends an ISUP message to originating programmable switch 110a to initiate the call. The PSTN 106 switches the call to an exemplary programmable switch 110a within the ISN 108a. The programmable switch 110a has switching capability and can switch the call within the ISN 108a using commands received from the switch controller 112a. The programmable switch 110a that receives the call is also referred to as the originating programmable switch 110a.

The ISUP SS7 messaging is the industry standard messaging for call set-up. The ISUP is described in more detail International Telecommunications Union (ITU) Signaling System Number 7 (SS7) Integrated Services Digital Network (ISDN) User Part (ISUP) NCT 1.113 (1995) document and the International Telecommunications Union (ITU) Signaling System 7 (SS7) Message Transfer Part (MTP) NCT 1.111 (1992) document which are referenced above. The ISUP messages used for call set-up are shown in Table 2 below. The PSTN sends an ISUP initial address message (JAM) to the programmable switch 110a.

TABLE 2

ISUP Messages Sent Between the Programmable Switch and the Switch Controller

| Abbreviation | Message Name | Description |
| --- | --- | --- |
| IAM | Initial Address Message | The Initial Address Message contains the digits identifying the called and calling parties, the type of network connection required, the characteristics of the calling party (payphone, etc.), and the characteristics of the call type (voice, data, fax, etc.). For inbound calls, the switch controller is mainly concerned with the called and calling party numbers which identify the product and operator group required to support the call. |
| ACM | Address Complete Message | The Address Complete Message contains the backwards acknowledgment through the network that the requested facilities in the IAM have been provided and where compromises were made (satellite hops, etc.). Additionally, the ACM indicates to the intermediate nodes that voice should be provided in the backwards direction of the call. |
| ANM | Answer Message | The Answer Message indicates that the call has been answered by the called party and indicates to the intermediate nodes that two way voice path should be provided. |
| REL | Release Message | The Release message indicates that one party in the call has requested to release the connection. Additionally, the REL message may contain various cause codes which indicate the reason for the termination of the call (normal and many possible abnormal conditions). |
| RLC | Release Complete | The Release Complete message indicates that a request for REL is granted from the previous nodes in the call and that the resources assigned to the call shall be released. |
| SUS | Suspend Message | The suspend message indicates temporary suspension of an active call. |
| RES | Resume Message | Follows a suspend message to indicate that suspended call is resumed. |

In step 712, the originating programmable switch 110a sends a programmable switch API message (PSAPI) message to an exemplary switch controller 112a to request service. Switch controller 112a that receives the message is also referred to as the originating switch controller 112a.

In step 714, the originating programmable switch 110a sends an ISUP message to PSTN 106 to indicate the address is complete. The ISUP message sent is an address complete message (ACM) ISUP message shown in Table 2. The address complete message indicates that the equipment needed to establish the path requested by the IAM has been allocated. The IAM requested a path between the calling device 104a and the programmable switch 110a. Therefore, the ACM indicates the equipment needed to establish a path between the calling device 104a and the programmable switch 110a is complete.

In step 716, the switch controller 112a determines whether a port is available on an ISN component 116. The determination made by the switch controller 112a is service specific. In other words, the switch controller 112a determines whether a port is available on the type of ISN component 116 (i.e. MOC 210 or ARU 204) capable of processing the call. For example, if a customer desires to speak with a human operator, the switch controller 112a determines whether a port is available on a MOC 210.

In determining whether a port is available on an ISN component 116, the switch controller 112a does not need to find an ISN component 116 that is available immediately. Switch controller 112a can queue a call which causes the customer to be given a message indicating a short wait is needed before processing can continue. The queuing process of the switch controller application program 602 then holds the call in a queue while other calls are processed. When a port becomes available on one of the ISN components 116 in the group, the queued call is connected to the available ISN component 116. Threshold volumes are set in software of the number of calls that may be queued in a particular queue at a given time. If the threshold volume is exceeded, the ISN component 116 is not available to process an incoming call. In addition, if an ISN component 116 is not in-service, then ISN component 116 is also not available to process an incoming call.

If a port is available on an ISN component 116 capable of processing the call, the ISN call set-up proceeds to step 732. If no port is available on an ISN component 116 capable of processing the call, the ISN call set-up proceeds to step 718.

In step 718, the switch controller determines if an alternate programmable switch 110 is available. In step 716, the originating switch controller 112a could not find an available port on an ISN component 116 capable of processing the call. Therefore, in step 718 the switch controller 112a determines whether an alternate programmable switch 110a is available. If an alternate programmable switch 110b . . . 110n is available, the ISN call set-up proceeds to step 722. If no alternate programmable switch 110b . . . 110n is available, then the ISN call set-up proceeds to step 720.

In step 720, the caller is denied the ability to place the call. If an ISN component 116 needed to complete the call is not available and the call cannot be transferred to another ISN 108, then the caller cannot place the call.

In step 722, the switch controller 112 sends a PSAPI message to an originating programmable switch 110a to park the channel and seize an intermachine trunk (IMT). An IMT is a physical trunk between two switches. The physical connection between the originating programmable switch 110a and the alternate programmable switch 110b is a telephony trunk established on a transmission medium capable of carrying digital telephony signals, such as fiber optic cable. The switch controller first sends a signal to the originating programmable switch 110a to park the channel that is interconnected via the PSTN 106 to the calling device 104a used by the caller. Parking the channel holds the channel for a period of time. The switch controller 112a then sends an outseize control PSAPI message to the originating programmable switch 110a to finds an available IMT between the originating programmable switch 110a and an alternate programmable switch 110b.

In step 724, the originating programmable switch 110a sends a message to an alternate programmable switch 110b to initiate the call. The originating programmable switch 110a initiates establishing the IMT to the alternate programmable switch 110b by sending an IAM message in ISUP format to the alternate programmable switch 110b. Because, similar to the originating programmable switch 110, the alternate programmable switch 110 is a dumb switch that cannot make complex call processing decisions, the alternate programmable switch 110b sends a PSAPI message to exemplary alternate switch controller 112b interconnected to the alternate programmable switch 110b to request commands for call processing. Similar to processing between the originating programmable switch 110a and the originating switch controller 112a, an ACM ISUP message acknowledges that the facilities requested by the IAM have been provided. The alternate switch controller 112b sends a command to the alternate programmable switch 110b in PSAPI format to send an ACM ISUP message to the originating programmable switch 110a. The alternate programmable switch 110b sends an ACM ISUP message to the originating programmable switch 110a to indicate that the facilities requested in the IAM, which is the IMT between the alternate programmable switch 110b and the originating programmable switch 110a, have been provided.

In step 726, the switch controller 112a determines whether a port is available on an ISN component 116. If a port is available on an ISN component 116, the ISN call set-up proceeds to step 728. If no port is available on an ISN component 116, the ISN call set-up proceeds to step 720. Similar to step 716, the switch controller 112a may send the call to an ISN component 116 that is available immediately or may queue the call to a group of ISN components 116 that have queues below the preestablished threshold volume. In addition to being available, the ISN component 116 that accepts the call must the type of ISN component 116 that is capable of handling the service the customer has chosen.

In an exemplary call, if a customer desires to speak with a human operator, the switch controller 112a determines whether a port is available on a MOC 210. In determining whether a port is available on a MOC 210, the switch controller 112 determines whether the call may be connected or queued to a MOC 210.

If a port is available on an ISN component 116, then the caller may proceed to initiate the call. The call continues to be processed in step 728. If no port is available on an ISN component 116, call processing proceeds to step 720 to terminate the call.

In step 728, the originating switch controller 112a sends PSAPI messages to the originating programmable switch 110a to connect the parked channel and the IMT channel. A connect with data PSAPI message causes the connection between the parked channel and the IMT channel. First, an outseize control acknowledgment PSAPI message is sent after the IMT between the originating programmable switch 110a and the alternate programmable switch 110b is established. Then, the originating switch controller 112a sends a connect with data PSAPI message to the originating programmable switch 110a. The connect with data PSAPI message commands the originating programmable switch 110a to connect the channel that was parked in step 722 to the IMT between the originating programmable switch 110a and the alternate programmable switch 110b that was acquired in step 724. The connection establishes a circuit between the caller using calling device 104a and the alternate programmable switch 110b via the originating programmable switch 110a.

In step 730, the alternate switch controller 112b commands the alternate programmable switch 110b to send an answer message (ANM) by sending a PSAPI message to the alternate programmable switch 110b. The ANM is an ISUP message which is shown in FIG. 2. The ANM will be described in further detail in step 742.

In step 732, the capable switch controller 112 sends a TC message to the ISN component 116. Step 732 is processed both when the originating programmable switch 110a and originating switch controller 112a are processing the call and when an alternate programmable switch 110b and alternate switch controller 112b are processing the call. The programmable switch 110 and switch controller 112 that processes the call are referred to as the capable programmable switch 110 and the capable switch controller 112 because the programmable switch 110 and the switch controller 112 that processes the call meet the requirements for call processing capability. In addition, the ISN 108 that processes the call is referred to as the capable ISN 108. The requirements for call processing capability are being in-service and having a port on an ISN component 116 that can accept the call immediately or on a queue.

The capable switch controller 112 sends a TC call offered message to the ISN component 116. The TC call offered message is shown in Table 1. The TC call offered message indicates to the ISN components 116 that a new call is being offered to the network. The ISN Ethernet LAN 214 receives the TC call offered message and is informed that an incoming call is being offered to an ISN component 116 on the capable ISN 108 platform.

The call is connected through to an available ISN component 116 that is of the type that can process the call. In steps 716 and 726, the switch controller 112 determines whether an ISN component 116 of the type that is capable of processing the call is available. Call processing proceeds to step 732 only if in step 716 or step 726, a switch controller 112 determines that an ISN component 116 of the type that is capable of processing the call is available.

In step 734, the ISN component 116 sends a TC response message to capable switch controller 112. The ISN component 116 sends a TC call offered response message which indicates that the TC call offered message was received and the ISN component 116 is processing the call.

In step 736, the capable switch controller 112 sends a PSAPI message to capable programmable switch 110 to request to send an answer message.

In step 738, the capable programmable switch 110 determines whether it is the originating programmable switch 110a. If the capable programmable switch 110 is the originating programmable switch 110a, the ISN call set-up proceeds to step 742. If the capable programmable switch 110 is not the originating programmable switch 110a, the ISN call set-up proceeds to step 740.

In step 740, the capable programmable switch 110 sends an answer message (ANM) to the originating programmable switch 110a.

In step 742, the originating programmable switch 110a sends the PSTN 106 an answer (ANM) message. The ANM message shown in Table 2 indicates that the call has been answered by the called party and indicates to the intermediate nodes that two way voice path should be provided. In the case of a connection to the ISN 108, the called party is the ISN component 116 rather than a party receiving the call via PSTN 106. The ISN components 116 such as the MOC 210 and the ARU 204 can interact directly with the caller using tones, voice, and information entered via a keypad on a telephone. The two way voice path provided as a result of the ANM message allows the caller to interact with the ISN component 116 and proceed with call processing by obtaining information or performing another function that the caller desires.

In step 744, the capable switch controller 112 sends capable programmable switch110 PSAPI messages to play a tone and connect the circuit.

Figure 8:
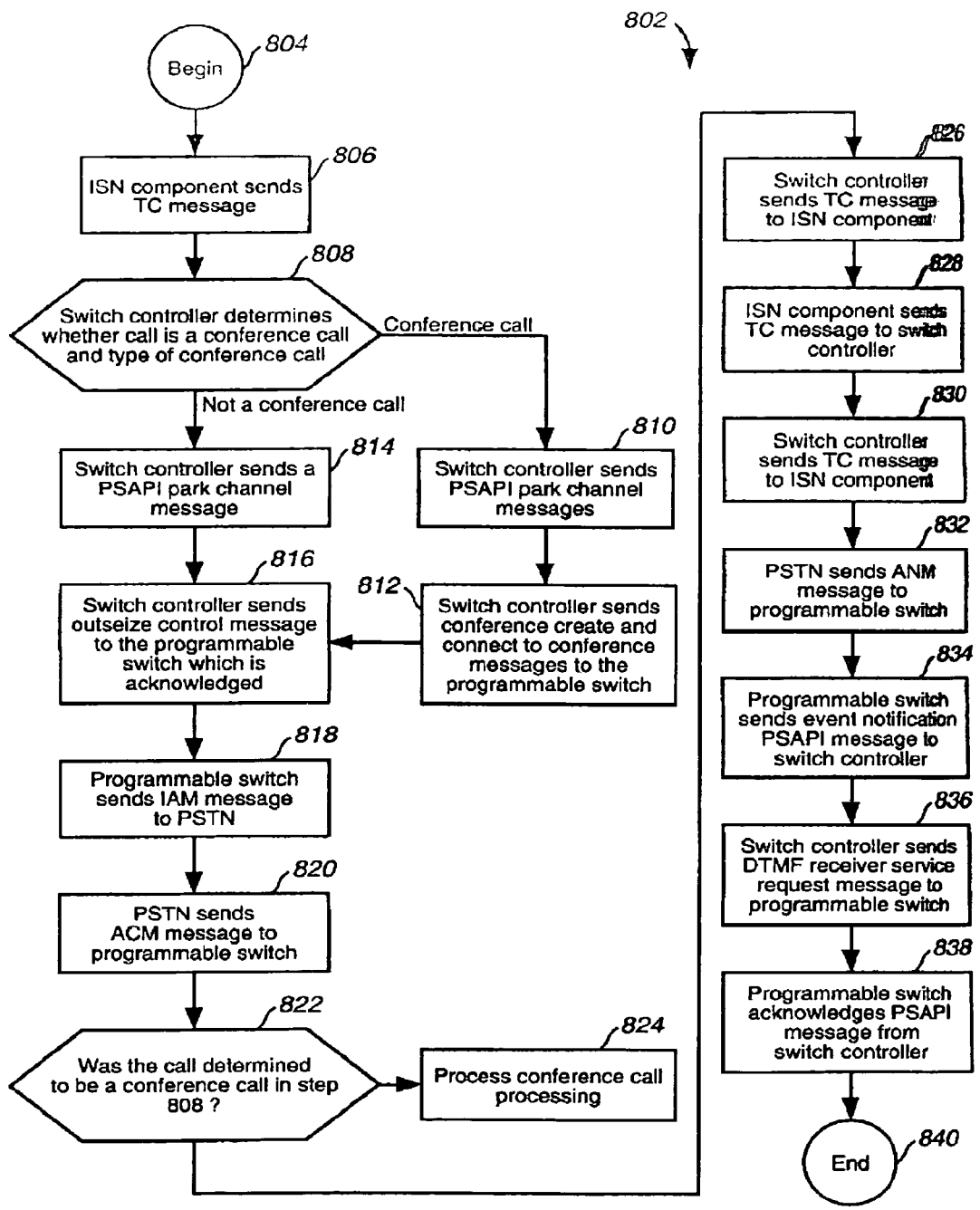
FIG. 8 is a flowchart of connecting a call from an ISN to a terminating party flow according to one embodiment of the present invention.

FIG. 8 is a flowchart of a call connection from the ISN to the terminating party 802. A call received by an ISN 108 is established with a caller as described in ISN call set up flow 702. Connecting the call from the ISN to the terminating party 802 involves continuing the call connection from the ISN 108 to the terminating party. The result is a circuit between the originating party, also referred to as a caller, and the terminating party, also referred to as a receiver.

In step 806, the ISN component 116 sends a TC message. The TC message sent by the ISN component 116 to the switch controller 112 is a TC conference message which is shown in Table 1. A TC conference message conferences in a terminating party. The flag settings of the TC conference message depend on the type of call that is being processed.

The call may be completed to a terminating party, may be a three way conference, or may be a consultative conference. If a call is completed to a terminating party, the originating party and terminating party are connected and the ISN component is no longer a party to the call. If a call is a three way conference, the originating party, the terminating party, and the ISN component 116, typically a MOC 210, are connected and are parties. If a call is a consultative conference, the originating party, the terminating party, and the ISN component are in a consultative conference which allows the ISN component or an operator operating an ISN component 116 such as MOC 210, to put either the originating party or terminating party on hold and consult with the remaining party that is not on hold.

In step 808, the switch controller 112 determines whether the call is a conference call. If the call is a conference call, the connecting a call from the ISN to the terminating party flow 802 proceeds to step 810. If the call is not a conference call, the connecting a call from the ISN to the terminating party flow 802 proceeds to step 814.

A conference flag associated with the TC conference message sent in step 806 indicates whether the call is a conference call. If the conference flag is set to No, the call is not a conference call. If the conference flag is set to Yes, the call is a conference call.

In step 810, the switch controller 112 sends one or more park channel messages which are acknowledged. Park channel messages are PSAPI messages that cause the programmable switch 110 to hold the channel associated with the park channel message. Because the originating party is connected to the ISN component 116 during call set up, the terminating party, which is not yet connected, must be established as a party to the call. Channels are held while the terminating party of the call is connected. The switch controller 112 sends park channel messages PSAPI messages to the programmable switch 110 to park each of the channels that will hold while the terminating party is connected. The switch controller 112 sends two park channel messages to hold the originating party and the ISN component 116.

In step 812, the switch controller 112 sends conference create and connect to conference messages to the programmable switch 110. In order to process a conference call, a conference bridge is needed. A conference bridge is telecommunications equipment that interconnects multiple parties to a conference call. Each channel of the call interconnects to a port on the conference bridge. The switch controller 112 sends a create conference message to the programmable switch 110 to allocate a conference bridge for the conference call. The programmable switch 110 responds acknowledging the create conference message and provides a conference identifier that identifies the conference call and can be used to interconnect to the appropriate ports on the conference bridge. The switch controller sends a connect to conference message to connect two parties to the conference. If the conference call is a three way conference, the switch controller 112 sends two connect to conference messages, one to connect the originator to the conference and the other to connect the ISN component 116, typically a MOC 210 operated by a human operator, to the conference call. If the conference call is a consultative conference and the human operator operating a MOC 210 puts the originating party on hold to consult with the terminating party, the switch controller 112 sends one connect to conference message to connect the operator to the conference call while the originating party is on hold.

After step 812 is processed, the connecting a call from the ISN to a terminating party flow 802 proceeds to step 816.

Step 814 is processed for calls that are not conference calls. In step 814, the switch controller 112 sends a PSAPI park channel message to the programmable switch 110. Similar to step 810, a park channel message is sent to hold the channel associated with the park channel message. Because the originating party is connected to the ISN component 116 during call set up, the terminating party, which is not yet connected, must be established as a party to the call. The switch controller 112 sends one park channel message to hold the originating party while the terminating party is connected. After step 814 is processed, the connecting a call from an ISN to a terminating party flow 802 proceeds to step 816.

In step 816, the switch controller 112 sends an outseize control message to the programmable switch 110. The outseize control message commands the programmable switch 110 to acquire a telephony circuit interconnection via telephone equipment, including transmission lines, switching equipment, and other equipment, within the PSTN 106 to the terminating party's calling device 104. One embodiment of the PSTN 106 includes local and long-distance telephone networks throughout the world. Calling devices throughout the world such as telephones and PCS are interconnected to the PSTN 106. To terminate an exemplary call to a recipients telephone, the outseize control message will cause a circuit to be acquired on a channel on a fiber optic transmission line selected to the appropriate destination by a telephone exchange which interconnects the channel on the fiber optical transmission to another channel on another fiber optic transmission line to cause a complete circuit path between the programmable switch and the recipient's calling device 104. The programmable switch 110 sends an acknowledgment of the outseize control message to the switch controller 112 to indicate that the outseize control message was received.

In step 818, the programmable switch 110 sends an IAM message to the PSTN 106. As shown in Table 2, the IAM message is an ISUP message that initiates call set-up. ISUP messages are used within the PSTN 106 to establish call connections. In the ISN call set-up flow 702 described with respect to FIG. 7, ISUP messages initiate call set-up from the originating party to the ISN. In the connecting of a call from the ISN to a terminating party flow 802, the IAM message is used to initiate call set-up from the ISN 108 to the terminating party. The IAM includes digits identifying the called and calling parties, the type of network connection required, characteristics of the call, and other information needed to establish a network connection via the PSTN 106.

In step 820, the PSTN 106 sends an ACM message to the programmable switch 110. The ACM, also described in Table 2, indicate that the facilities requested by the IAM have been provided. In the ISN call set-up flow 702 described with respect to FIG. 7, the ACM message indicates that the facilities needed to establish the telephone circuit between the originating party and the ISN 108 were established. In the connecting a call from the ISN to a terminating party flow 802, the ACM message indicates that the facilities needed to establish the telephone circuit between the ISN 108 and the terminating party have been established.

In step 822, if the call was determined to be a conference call in step 808, the connecting a call from the ISN to the terminating party flow 802 proceeds to step 824. In step 824 processes conference call processing is processed which is described in further detail with respect to FIG. 9. If the call was determined not to be a conference call, the connecting a call from the ISN to the terminating party flow 802 proceeds to step 826.

In step 826, the switch controller 112 sends a TC message to the ISN component 116. The switch controller 112 sends a TC conference response message to the ISN component 116. In step 806, the ISN component 116 sent a TC conference message to the switch controller 112 to conference in remaining parties to the call. In step 826, the switch controller 112 responds to the TC conference message to indicate that the TC conference message was received.

In step 828, the ISN component 116 sends a TC message to the switch controller 112. A TC call park message is to the switch controller 112. The TC call park message, shown in Table 2, causes an active call to be parked. In addition, the TC call park message causes the switch controller 112 to start the call park timer and set time point 6.

In step 830, the switch controller 112 sends a TC message to the ISN component 116. A TC call park response message to the ISN component 116 to indicate that the TC call park message sent in step 828 was received.

In step 832, the PSTN 106 sends an ANM message to the programmable switch 110. The ANM message shown in Table 2 indicates that the call has been answered by the called party and indicates to the intermediate nodes that a two way voice path should be provided. The two way voice path has been provided between the originating and terminating parties.

In step 834, the programmable switch sends an event notification PSAPI message to the switch controller 112. The event notification message indicates to the switch controller 112 that the ANM message was received by the programmable switch 110 in step 832.

In step 836, the switch controller 112 sends a dual tone multifrequency (DTMF) receiver service request message to the programmable switch 110. The switch controller 112 sends a DTMF request message to the programmable switch 110 to allocate a DTMF receiver that is capable of accepting digit tones if a caller chooses to reoriginate a call. A caller reoriginates a call by pressing the pound sign and dialing another called number before performing an action that terminates the call, such as hanging up. A DTMF receiver is capable of accepting DTMF signals such as those sent by a telephone or other calling device to signal to the PSTN 106. Signals sent by a calling device provide information such as an indication that a customer wishes to place a call and the digits dialed by the customer to place the call.

In step 838, the programmable switch 110 acknowledges the service request message from the switch controller 112. Acknowledging the service request message indicates to the switch controller 112 that the programmable switch 110 received the service request message.

Figure 9:
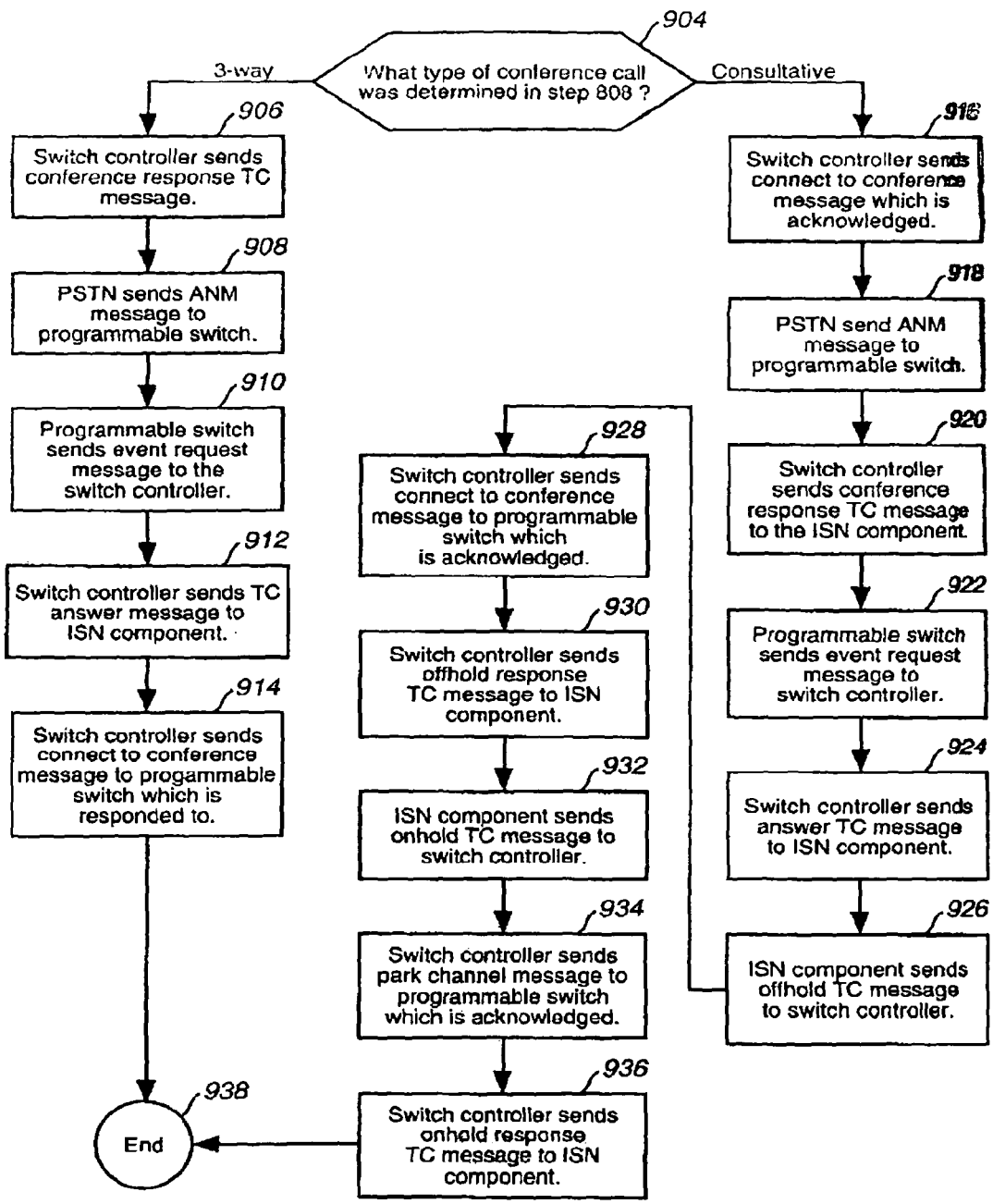
FIG. 9 is a flowchart of conference call processing according to one embodiment of the present invention.

FIG. 9 is a flowchart of conference call processing 824. In step 904, the switch controller 112 uses the type of conference call being processed to continue call processing. The type of conference call is sent with the TC message sent from the ISN component 116 in step 808. If the conference call being processed is a three-way conference call, the conference call processing flow 824 proceeds to step 906. If the conference call being processed is a consultative conference call, the conference call processing flow 824 proceeds to step 916.

In step 906, the switch controller 112 sends a conference response TC message to the ISN component 116. The TC conference response message indicates that the TC conference message that was sent in step 806 was received by the switch controller 112.

In step 908, the PSTN 106 sends an ANM message to the programmable switch 110. The ANM message, shown in Table 2, indicates that the call has been answered by the called party and indicates to the intermediate nodes that a two way voice path should be provided. The ANM message indicates that the voice path has been established between the ISN component 116 and the terminating party. A voice path had been established between the originating party and the ISN component 116 during processing of the ISN call set-up flow 702. With both voice paths established, the originating and terminating leg, a conference call is created.

In step 910, the programmable switch 110 sends an event request message to the switch controller 112. The event request message indicates that the PSTN 106 sent the ANM message in step 908.

In step 912, the switch controller 112 sends a TC answer message to the ISN component 116. The TC answer message, shown in Table 1, indicates that an answer indication was received from the terminating party.

In step 914, the switch controller 112 sends a connect to conference message to the programmable switch 110 which is responded to. In step 812, the ISN component 116 and the originating party were connected to a conference bridge. The connect to conference message connects the terminating party to the conference bridge. The connect to conference bridge response indicates that the connection to conference is complete. After step 914 is processed, the conference call processing flow 824 is complete as is reflected in step 938. The originating party, terminating party, and ISN component 116 are connected in a conference call.

If in step 904, it was determined that the type of conference call being processed is a consultative conference call, the conference call processing flow 824 proceeds to step 916. In step 916, the switch controller 112 sends a connect to conference message which is acknowledged. In step 812, the ISN component 116 was connected to a conference bridge. The connect to conference message connects the terminating party to the conference bridge. The connect to conference bridge response indicates that the connection to the conference bridge is complete.

In step 918, the PSTN 106 sends an ANM message to the programmable switch 110. The ANM message, shown in Table 2, indicates that the voice path has been established between the ISN component 116 and the terminating party. A voice path had been established between the originating party and the ISN component 116 during processing of the ISN call set-up flow 702. With both voice paths established, the originating and terminating leg, a conference call is created.

In step 920, the switch controller 112 sends a conference response TC message to the ISN component 116. The TC conference response message indicates that the TC conference message that was sent in step 806 was received by the switch controller 112.

In step 922, the programmable switch 110 sends an event request message to the switch controller 112. The event request message indicates that an ANM message was sent by the PSTN 106 and that a two way voice path has been established.

In step 924, the switch controller 112 sends an answer TC message to the ISN component 116. The switch controller sends a TC answer message, shown in Table 1, which indicates that an answer indication was received from the terminating party. The call resulting from the steps processed is the ISN component 116, the originating party, and the terminating party are in a consultative conference and the originating party is on hold.

In step 926, the ISN component 116 sends an off hold TC message to the switch controller 112. The TC off hold message, shown in Table 1, takes a leg off hold. The TC off hold message is sent by the ISN component 116 to take the originating party off hold. If the ISN component 116 is a MOC 210, the human operator will signal to take the originating party off hold using the off hold TC message.

In step 928, the switch controller 112 sends a connect to conference message to the programmable switch 110 which is acknowledged. In step 812, the ISN component 116 was connected to a conference bridge. The connect to conference message connects the terminating party to the conference bridge. In step 916, the connect to conference message connects the originating party to the conference.

In step 930, the switch controller 112 sends an off hold response TC message to the ISN component 116. The off hold response IC message indicates that the off hold TC message was received by the switch controller 112 in step 926.

In step 932, the ISN component 116 sends an on hold TC message to the switch controller 112. The on hold TC message, shown in Table 1, causes a specific leg of the call to be held. A feature of the consultative conference is that the ISN component 116 or the human operator, if the ISN component 116 is a MOC 210, can issue on hold and off hold commands to place the originating and terminating parties on and off hold as needed. The on hold TC message causes the originating party to be put on hold.

In step 934, the switch controller 112 sends a park channel message to the programmable switch 110 which is acknowledged. The park channel message commands the programmable switch 110 to park the channel associated with the originating party.

In step 936, the switch controller 112 sends an on hold response TC message to the ISN component 116. The on hold response TC message indicates that the on hold message was received by the switch controller 112.

Figure 10:
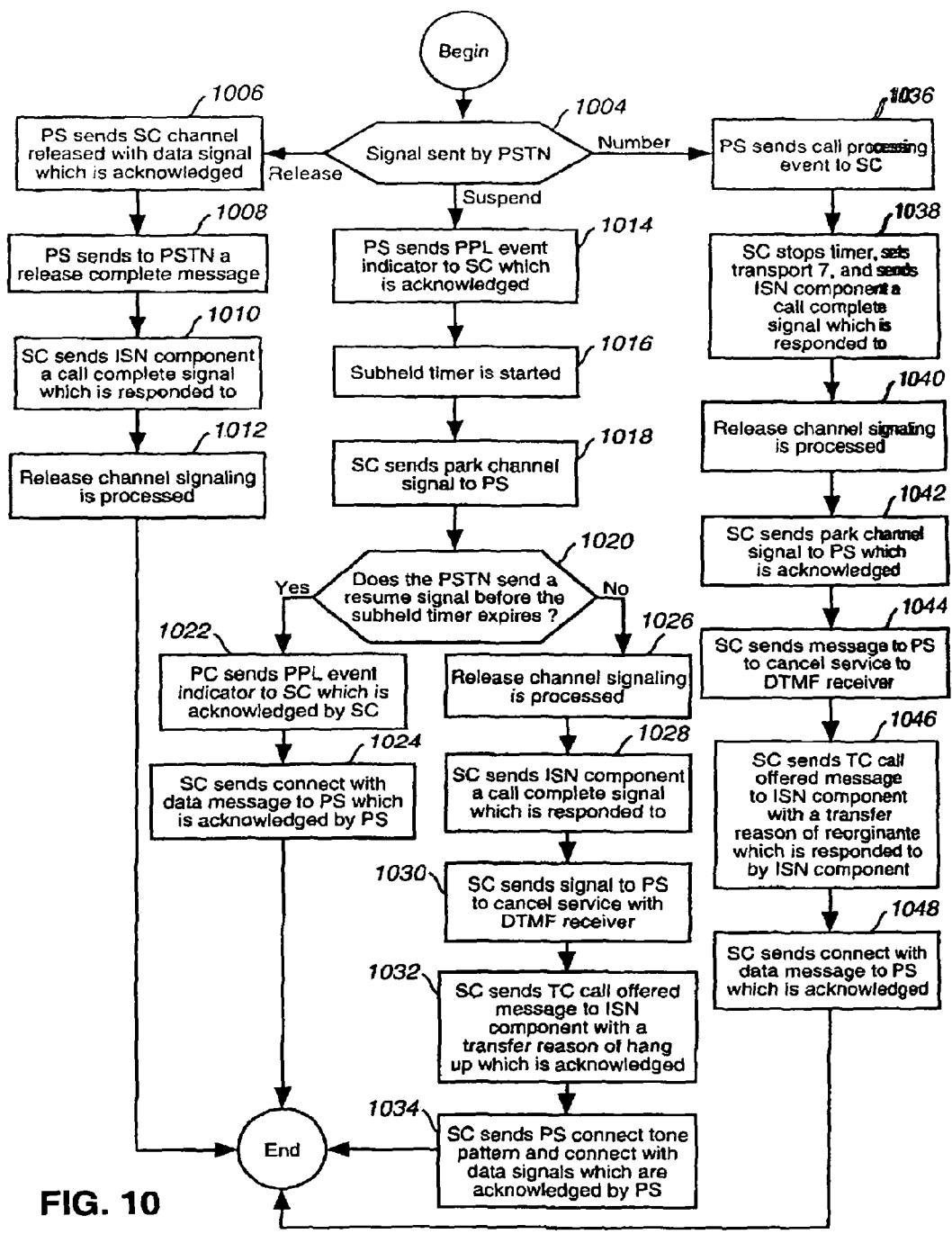
FIG. 10 is a flowchart of a call termination flow according to one embodiment of the present invention.

FIG. 10 is a flowchart of a call termination 1002. Call termination terminates a call that is in progress. For example, after call initiation, two parties speak and then the parties terminate the call (i.e. hang-up). The first party to place the receiver on the phone initiates termination of the call. Termination of the call disconnects the channels on the transmission lines and telephone equipment used to carry the call. The flowchart of a call termination 1002 includes three termination techniques: termination, suspend (resume and release), and reorigination.

Calls may terminate in various ways depending on the choice of the parties and the calling device used. For example, if the calling device 104 is a computer, the call may terminate by the party logging off. In addition to placing a receiver on a handset or logging off, a party may terminate a call by reorigination. A party reoriginates a call by dialing pound and a new number (or a computer may dial pound and a new number). A reorigination terminates the call in progress (i.e. has the same effect as placing a receiver on the telephone) and initiates a call to a new party.

Some telephone networks include a suspend feature that a call is not terminated immediately upon receiving a signal that one of the parties has placed the receiver on the phone or logged off. Networks with the suspend feature leave the call in progress for a specified amount of time, such as 20-30 seconds. During that time, the party or parties that terminated the call have the option to pick up the receiver and resume the call. Unlike reorigination in which the call between the two original parties is terminated and a new call is established between one of the parties (the party that dialed the pound and the number) and a new party, a resumed call resumes the call after it was suspended between the original two parties. However, the parties may choose not to resume the call and the call will release and be terminated after expiration of the timer.

In step 1004, a signal is sent by PSTN 106. The PSTN 106 initially receives a signal from the calling device 104 when one of the parties terminates the call. Receipt of the termination signal from the calling device 104 causes the PSTN 106 to send a signal to the programmable switch 110.

The PSTN 106 sends either a release, suspend, or reorigination signal. The release signal initiates call termination. The released signal is an ISUP message which, as shown in Table 2, indicates that one party in the call has requested to release the connection. The release message may contain various cause codes which indicate the reason for the termination of the call. The suspend signal causes the channels to be held and a timer to be started. The reorigination signal terminates the call in progress and begins a new call.

If the PSTN 106 sends a release signal, the call termination flow 1001 proceeds to step 1006. If the PSTN 106 sends a suspend signal, the call termination flow 1001 proceeds to step 1014. If the PSTN 106 sends a reorigination signal, the call termination flow 1001 proceeds to step 1036.

In step 1006, the programmable switch (PS) 110 sends the switch controller (SC) 112 a channel released with data signal which is acknowledged. The channel released with data signal sent from the programmable switch 110 indicates to the switch controller 112 that a release message was received from the PSTN 106 in step 1004. Acknowledging the channel released with data signal indicates to the programmable switch 110 that the channel released with data signal was received.

In step 1008, the programmable switch 110 sends to the PSTN 106 a release complete message. The release complete message, shown in Table 2, indicates that the request for release is granted from the previous nodes and the resources assigned to the call shall be released. During call set-up, channels are assigned in bandwidth of telephony transmission cables that are interconnected via telecommunications equipment to form a complete circuit to transmit signals of the call. The release complete message indicates that the request for release is granted and the resources, including the channels that are assigned in the bandwidth of the telephony transmission cables, and the interconnections via telecommunications equipment are released and can be reassigned for use to carry transmission signals for another call.

In step 1010, the switch controller 112 sends an ISN component 116 a call complete signal which is responded to. The call complete signal indicates that the call is complete and the end-to-end circuit that was used for the call is being released.

In step 1012, a release channel signal is processed. Release channel signal processing 1101 is the messaging between the switch controller 112, programmable switch 1110, and the PSTN 106 which is processed to release the channel. Release channel signal processing 1101 is described in further detail with respect to FIG. 11. After step 1012 the call termination flow 1002 is complete as reflected by step 1050.

If in step 1004, the signal that was sent by the PSTN 106 was suspend then step 1014 is processed. In step 1014 the programmable switch 110 sends a programmable protocol language (PPL) event indicator to switch controller (SC) 112 which is acknowledged. The PPL event indicator informs the switch controller 112 that a suspend signal was received from the PSTN 106.

In step 1016, the subheld timer is started. The subheld timer is set for a specified time the channel will be held to await a resume signal. If no resume signal is received, the call will be terminated. The subheld timer counts the time the call is suspended awaiting either expiration of the subheld timer or receipt of a resume signal.

In step 1018, the switch controller 112 sends a park channel signal to the programmable switch 110. The park channel signal parks associated channels as specified by the park channel signal. A parked channel is held by the programmable switch 110 until the programmable switch 110 obtains another signal providing a command to control the channel. The channels that transmitted signals of the call between the parties are held to await the possibility that the parties will resume the call.

In step 1020 the PSTN determines whether the subheld timer has expired before a resume signal was received. Tithe subheld timer has expired before the resumed signal was received the call termination flow 1002 proceeds to step 1022 and the call is terminated. If a resume signal is received before the subheld timer expired then the call termination flow proceeds to step 1026 and the call is resumed between the parties of the original call.

In step 1022 the programmable switch 110 sends a PPL event indicator signal to the switch controller 112 which is acknowledged by the switch controller 112. The PPL event indicator informs the switch controller 112 that a resume signal was received before the subheld timer expired. The acknowledgment indicates that the switch controller 112 received the PPL event indicator signal.

In step 1024 the switch controller 112 sends a connect with data message to the programmable switch 110 which is acknowledged by the programmable switch 110. After step 1024 the call termination flow 1002 proceeds to step 1050. The connect with data message connects the associated channels as specified in the connect with data message. The channels specified in the connect with data message are the same channels that were parked in step 1018. After step 1024 is complete, the call termination flow 1001 is complete as indicated by step 1050.

If the subheld timer expires before a resume signal is received, step 1026 is processed. In step 1026, release channel signaling is processed. Release channel signal processing 1101 is the messaging between the switch controller 112, programmable switch 1110, and the PSTN 106 which is processed to release the channel. Release channel signal processing 1101 is described in further detail with respect to FIG. 11.

In step 1028, the switch controller 112 sends an ISN component 116 a call complete signal which is responded to. The call complete signal indicates that the call is completed and the port on the ISN component 116 that was allocated for the call is available for use to process another call. The call complete signal is responded to by the ISN component 116 to indicate to the switch controller 112 that the call complete signal was received by the ISN component 116.

In step 1030, the switch controller 112 sends a cancel service signal to the programmable switch 110. The cancel service signal indicates to the programmable switch 110 that the DTMF receiver that was in use for the call can be disconnected and made available for another call. The DTMF receiver is assigned to the call in step 836 of connecting a call from an ISN to a terminating party flow 802 that was described with respect to FIG. 8. In step 836, the switch controller 112 sends a DTMF request message to the programmable switch 110 to allocate a DTMF receiver that is capable of accepting digit tones if a caller chooses to reoriginate a call. A DTMF receiver is capable of accepting DTMF signals such as those sent by a telephone or other calling device to signal to the PSTN 106.

In step 1032 the switch controller 112 sends a TC call offered message with a transfer reason of hangup to the ISN component 116 which is responded to. The TC call offered message with a transfer reason of hangup indicates to the ISN component 116 that the call is being terminated. The TC call offered message with transfer reason of hangup is responded to by the ISN component 116 to indicate that the TC call offered message with transfer reason of hangup was received.

In step 1034 the switch controller 112 sends the programmable switch 110 a connect tone pattern and connect with data signals which are acknowledged by programmable switch 110. When the terminating party that was connected during the connecting a call from an ISN to a terminating party flow 802 chooses to terminate the call, the originating party and the operator are reconnected in order to allow the originating party to place another call or have access to another service. An alternate embodiment includes disconnecting both the terminating party and the originating party regardless of which party terminates the call first. In this alternate embodiment, step 1034 is not performed and the call termination flow 1001 is complete after step 1032 as indicated by step 1050.

However, if the operator and the originating party are reconnected, the switch controller sends the programmable switch 110 a connect tone pattern and connect with data signals to reconnect the operator and the originating party. The connect tone pattern plays a zip tone which alerts the operator that a caller wishes service. The connect with data signal interconnects channels to the calling device 104 used by the caller and the ISN component 116 used by the operator. After step 1034 is processed the call termination flow 1002 is complete as indicated by step 1050.

If the signal sent in step 1004 is the reorigination signal then the call termination flow 1002 proceeds to step 1036. In step 1036 the programmable switch sends the call processing event signal to the switch controller 112. The call processing event signal is a PSAPI message that indicates to the switch controller 112 that a reorigination signal was received by the programmable switch 110 from the PSTN 106. The call processing event signal is acknowledged by the switch controller 112 which informs the programmable switch 110 that the call processing event signal was received by the switch controller 112.

In step 1038, the switch controller 112 sends an ISN component 116 a call complete signal which is responded to. The switch controller 112 sends a call complete signal to the ISN component 116 to indicate that a signal has been received from the PSTN 106 indicating that the call between the original parties will be terminated.

In step 1040 a released channel signaling is processed. Release channel signal processing 1101 is the messaging between the switch controller 112, programmable switch 1110, and the PSTN 106 which is processed to release the channel. Release channel signal processing 1101 is described in further detail with respect to FIG. 11.

In step 1042 the switch controller 112 sends a park channel signal to the programmable switch 110. The park channel signal parks associated channels as specified by the park channel signal. A parked channel is held by the programmable switch 110 until the programmable switch 110 obtains another signal providing a command to control the channel. The originating party, who selected to reoriginate the call, is held until the terminating party is disconnected and the operator can assist the originating party in connecting the new call.

In step 1044 the switch controller 112 sends DSP service canceled to the programmable switch 110. The cancel service signal indicates to the programmable switch that the DTMF receiver that was in use for the call can be disconnected and made available for another call. The DTMF receiver is assigned to the call in step 836 of connecting a call from an ISN to a terminating party flow 802 that was described with respect to FIG. 8. In step 836, the switch controller 112 sends a DTMF request message to the programmable switch 110 to allocate a DTMF receiver that is capable of accepting digit tones if a caller chooses to reoriginate a call. A DTMF receiver is capable of accepting DTMF signals such as those sent by a telephone or other calling device to signal to the PSTN 106.

In step 1046 the switch controller 112 sends a TC call offered message to ISN component 116 with the transfer reason of reoriginate which is responded to by the ISN component 116. A TC call offered message, shown in Table 1, indicates that a new call is offered to the platform. The TC call offered message with a transfer reason of reoriginate indicates that the new call is being placed by a caller that wishes to reoriginate a call.

In step 1048 the switch controller 112 sends a connect with data message to the programmable switch 110. The connect with data message connects the originating party and the operator to allow the operator to assist the originating party. After step 1048 is performed the call termination flow 1002 proceeds to step 1050.

Figure 11:
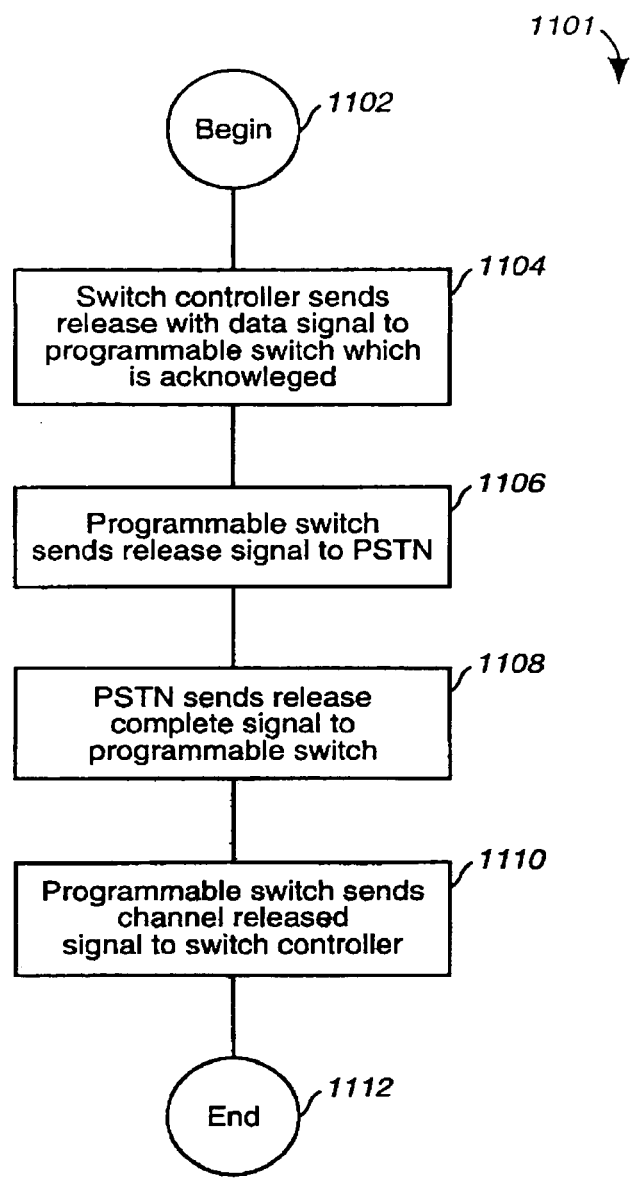
FIG. 11 is a flowchart of a release channel signaling flow according to one embodiment of the present invention.

FIG. 11 illustrates a flow chart of a the release channel signaling flow 1040. In step 1104 the switch controller 112 sends a release with data signal to the programmable switch 110 which is acknowledged.

In step 1106 the programmable switch 110 sends a release signal to the PSTN 106. As shown in Table 2, the release signal indicates that one party in the call has recnested to release the connection.

In step 1108 the PSTN 106 sends a release complete signal to programmable switch 110. As shown in Table 2, the release complete message indicates that a request for a release is granted from the previous nodes in the call and that the resources assigned to the call shall be released.

In step 1110 the programmable switch 110 sends a channel release signal to the switch controller 112 which is acknowledged. The channel release signal indicates that the switch controller 112 command to release the channel has been performed and the channel is released and available for another call.

Figure 12:
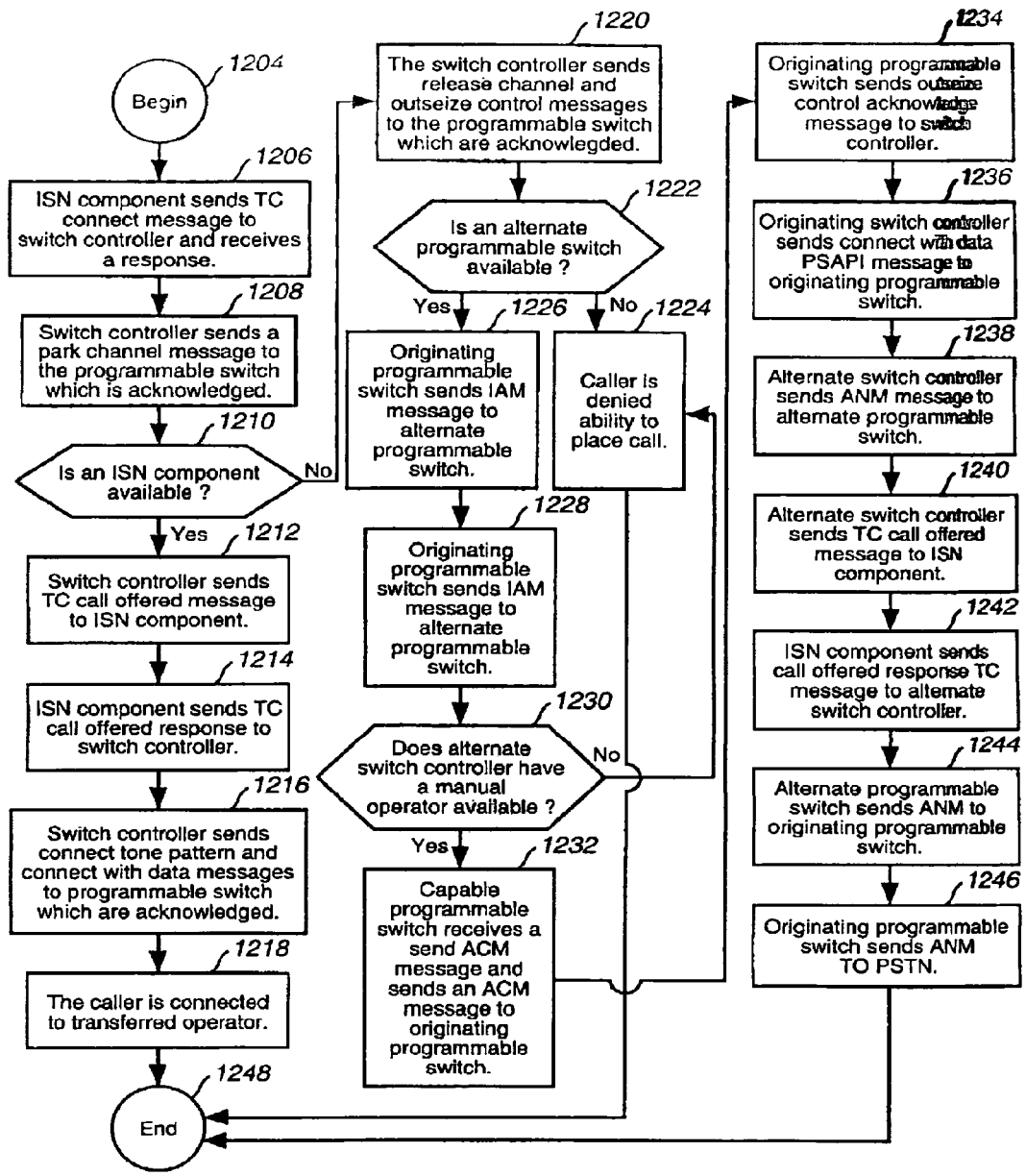
FIG. 12 is a flowchart of agent to agent blind transfer according to one embodiment of the present invention.

FIG. 12 illustrates agent to agent blind transfer flow 1202. The agent-to-agent blind transfer flow 1202 provides transfer of a call from one agent to another agent. The agent-to-agent blind transfer flow 1202 will be described with respect to an exemplary call. The exemplary call is connected between a calling device 104a and an ISN component 116a via the PSTN 106, a programmable switch 110a, and a switch controller 112a. The ISN component 116a is in ISN 108a. The agent-to-agent blind transfer flow will transfer the call to an alternate ISN component 116b. If an alternate ISN component 116b is not available on ISN 108a, the agent-to-agent blind transfer flow 1202 will transfer the call to an alternate ISN component 116b on an alternate ISN 108b via an alternate programmable switch 110b and an alternate switch controller 112b.

In step 1206, the ISN component 116a sends a TC connect message to the switch controller 112a and receives a response. The TC connect message indicates that a connection is needed to an alternate ISN component 116b.

In step 1208, the switch controller 112a sends a park channel message to the programmable switch 110a which is acknowledged. The park channel message holds the channels while the call is being transferred to an alternate ISN component 116b.

In step 1210, the switch controller 112a determines whether an alternate ISN component 116b is available to accept the transferred call. If an alternate ISN component 116b is available to receive the transferred call, the agent to agent blind transfer 1202 proceeds to step 1212. If an alternate ISN component 116b is not available to receive the transferred call, the agent to agent blind transfer 1202 proceeds to step 1220.

In step 1212, the switch controller 112a sends a TC call offered message to the ISN component 1166. The TC call offered message indicates that a new call is offered to the platform. The TC call offered message alerts the alternate ISN component 116b that it will be offered a call, which in the agent to agent blind transfer flow 1202, is the call that is being transferred from the first ISN component 116a.

In step 1214, the ISN component 116b sends a TC call offered response to the switch controller 112a. The IC call offered response indicates to the switch controller 112a that the TC call offered message was received.

In step 1216, the switch controller 112a sends connect tone pattern and connect with data messages to the programmable switch 110a which are acknowledged. The connect tone pattern message plays a zip tone to alert the operator of the incoming call. The connect with data message connects the call between the caller and the alternate ISN component 116b that will receive the transferred call.

In step 1218, the caller is connected to the transferred ISN component 116b. After step 1218 is processed, the agent to agent blind transfer 1202 is complete as indicated by step 1248.

If in step 1210 the switch controller 112a determines that a second ISN component 116 is not available, the agent to agent blind transfer 1202 proceeds to step 1220. In step 1220, the switch controller 112a sends a release channel and outseize control message to the programmable switch 110a which are acknowledged. The release channel message releases the channel connected to the ISN component 116b as an alternate ISN component 116b is sought via an alternate ISN 108b. The outseize control message requests that another channel via an IMT facility is established via an alternate switch controller 112b. The outseize control message requests that a channel on an IMT is established between the programmable switch 110a and an alternate programmable switch 110b to send the call to an alternate ISN component 116b on an alternate ISN 108b. If an alternate programmable switch 110b is available, the switch controller 112b sends commands to the originating programmable switch 110a to establish a connection between the originating programmable switch 110a and the alternate programmable switch 110b.

In step 1222, the agent-to-agent blind transfer 1202 determines whether an alternate programmable switch 110b is available.

Step 1224 is performed if no alternate programmable switch 110b is available. In step 1224, the caller is denied the ability to continue the call. If no alternate programmable switch 110b is available, the call cannot be transferred to another agent. The caller is notified and the call is terminated.

In step 1226, the originating programmable switch 110a sends an IAM message to the alternate programmable switch 110b. As shown in Table 2, the IAM message is an ISUP message that initiates call set-up. ISUP messages are used within the PSTN 106 to establish call connections. The JAM contains digits identifying the called and calling parties, the type of network connection required, characteristics of the call, and other information needed to establish a network connection via the PSTN 106.

In step 1228, the alternate programmable switch 110b sends a request for service with data message to the alternate switch controller 112b. The request for service with data message informs the switch controller 112b that an incoming call is being offered to the platform and requests service. The request for service with data message is acknowledged to inform the alternate programmable switch 110 that the request for service with data message was received by the alternate switch controller 112b.

In step 1230, the alternate switch controller 112b determines whether an ISN component 116 is available. If it is determined in step 1230 that the alternate switch controller 112b does have an alternate ISN component 116b available, the agent to agent blind transfer 1202 proceeds to step 1232. If it is determined in step 1230 that the alternate switch controller 112b does not have an alternate ISN component 116b available, the agent to agent blind transfer 1202 proceeds to step 1224.

In step 1232, the capable programmable switch 110 receives a send ACM message from the capable switch controller 112 and sends an ACM message to the originating programmable switch 110a. The originating programmable switch 110a sends the ACM ISUP message shown in Table 2 which indicates that the address is complete. As indicated in Table 2, the ACM indicates that the equipment needed to establish the path requested by the IAM has been allocated. The path that is established using to satisfy the IAM request is between the calling device 104a and the programmable switch 110a In step 1234, the originating programmable switch 110a sends an outseize control message to the originating switch controller 112a which is acknowledged.

In step 1236, the originating switch controller 112a sends a connect with data message to the originating programmable switch 110a. The connect with data message indicates that the channels between the caller and the ISN component 116b that will receive the transferred call should be connected.

In step 1238, the alternate switch controller sends a send ANM message to the originating programmable switch 110a. The alternate switch controller 112b commands the originating programmable switch 110a to send an ANM message.

In step 1240, the alternate switch controller 112b sends a TC call offered message to the ISN component 116b. As shown in Table 1, a TC call offered message indicates that a new call is being offered to the platform. The TC call offered message indicates that a new call, transferred from another platform, is being offered to an available ISN component 116b interconnected to alternate switch controller 112b.

In step 1242, the ISN component 116 sends a call offered response TC message to the alternate switch controller 112b. The call offered response TC message indicates to the alternate switch controller 112b that the call offered TC message was received by the ISN component 116b In step 1244, the alternate programmable switch 110b sends an ANM to the originating programmable switch 110a. The ANM message shown in Table 2 indicates that the call has been answered by the called party and indicates to the intermediate nodes that two way voice path should be provided. Because the call is being established to ISN 108b, the called party is the ISN component 116b rather than a party receiving the call via PSTN 106. ISN components 116 such as the MOC 210 and the ARU 204 can interact directly with the caller using tones, voice, and information entered via a keypad on a telephone. The two way voice path provided as a result of the ANM message allows the caller to interact with the ISN component 116b and proceed with call processing, obtaining information, or other function that the caller desires.

In step 1246, the originating programmable switch 110a sends and ANM to the PSTN 106.

Figure 13:
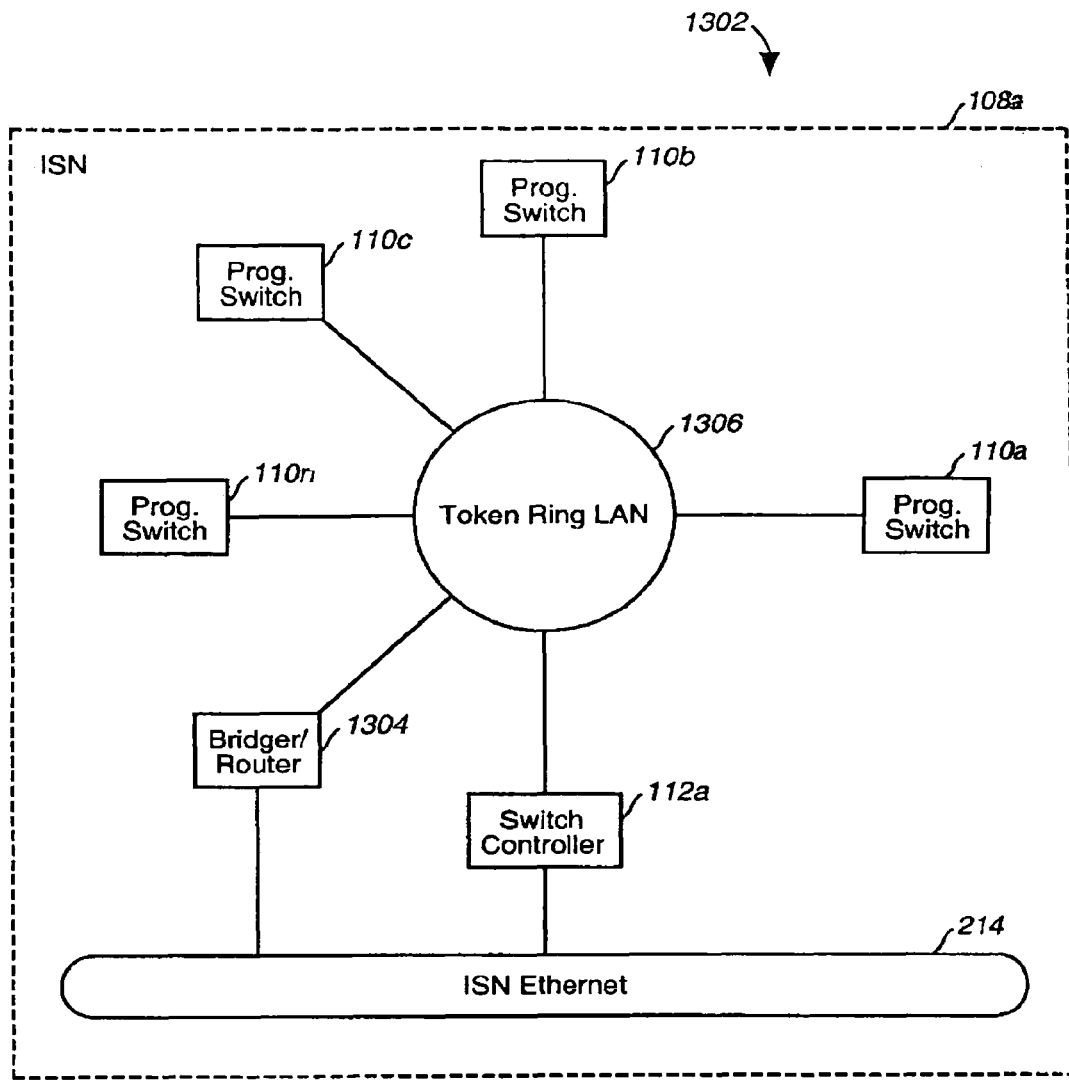
FIG. 13 is an intelligent service network configuration with multiple programmable switches and a token ring LAN according to one embodiment of the present invention.

FIG. 13 is a block diagram 1302 of an ISN 108a with multiple programmable switches 110 and a token ring LAN 1306. In order to use one switch controller 112A with multiple programmable switches 110, the multiple programmable switches 110 are interconnected to the switch controller 112a via a Token ring LAN 1306. The switch controller 112a communicates with each of the programmable switches 110 using messages from a switch-specific API (i.e., Excel API), sent via TCP/IP over the Token ring LAN 1306. A bridger/router is connected to the Token ring LAN 1306 and the ISN Ethernet LAN 214. Programmable switches 110 can be added and removed to scale the ISN 108a capacity, without having to modify the code of the switch controller112a, and without having to add switch controllers 112. If a new programmable switch 110c is added, the switch controller is configured to reflect the new programmable switch 110c and its port capacity.

Figure 14A:
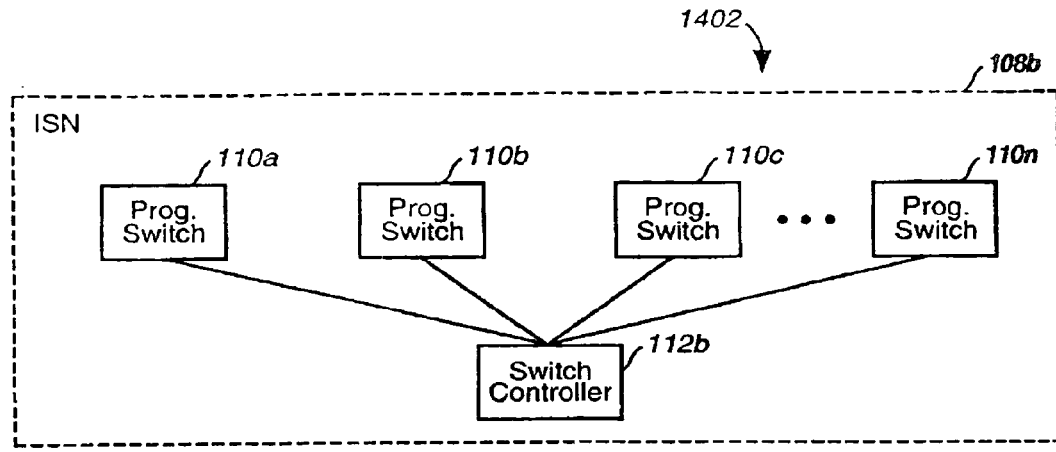
FIG. 14A is an intelligent service network configuration with multiple programmable switches according to one embodiment of the present invention.
Figure 14B:
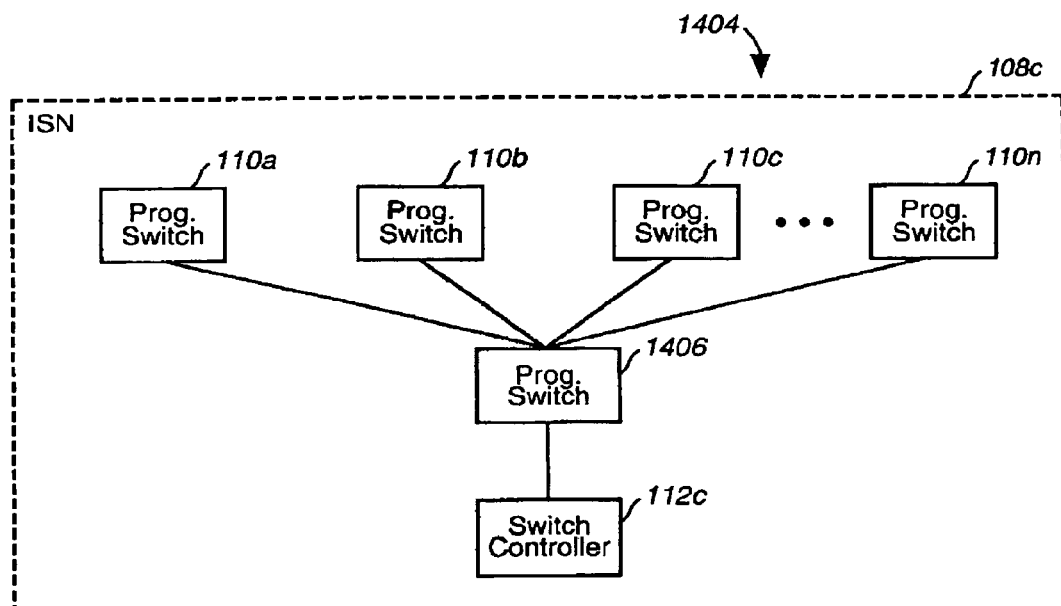
FIG. 14B is an intelligent service network with a bridging programmable switch according to one embodiment of the present invention.

FIGS. 14a and 14b illustrate two additional methods of logical connectivity between a switch controller 112b and multiple programmable switches. FIG. 14a is a block diagram 1402 of an ISN 108b with multiple programmable switches 110. In FIG. 14a, the switch controller 112a is connected to and communicates directly with each programmable switch 110.

FIG. 14b is a block diagram 1404 of an ISN 108c with a bridging programmable switch 1406. In FIG. 14b, a bridging programmable switch 1406 is used for routing calls to the switch controller 112c. The bridging programmable switch 1406 is connected to each of the programmable switches 110 and the switch controller 112b. The switch controller 112b sends messages to the bridging programmable switch 1406, which routes the messages to the appropriate programmable switch 110. The hardware and software of the bridging programmable switch 1406 is the same as the hardware and software of the other programmable switches 110. The bridging programmable switch 1406 is distinguishable from the other programmable switches because it is used as a router. In addition, the bridging programmable switch 1406 may be configured differently than the other programmable switches.

Figure 15:
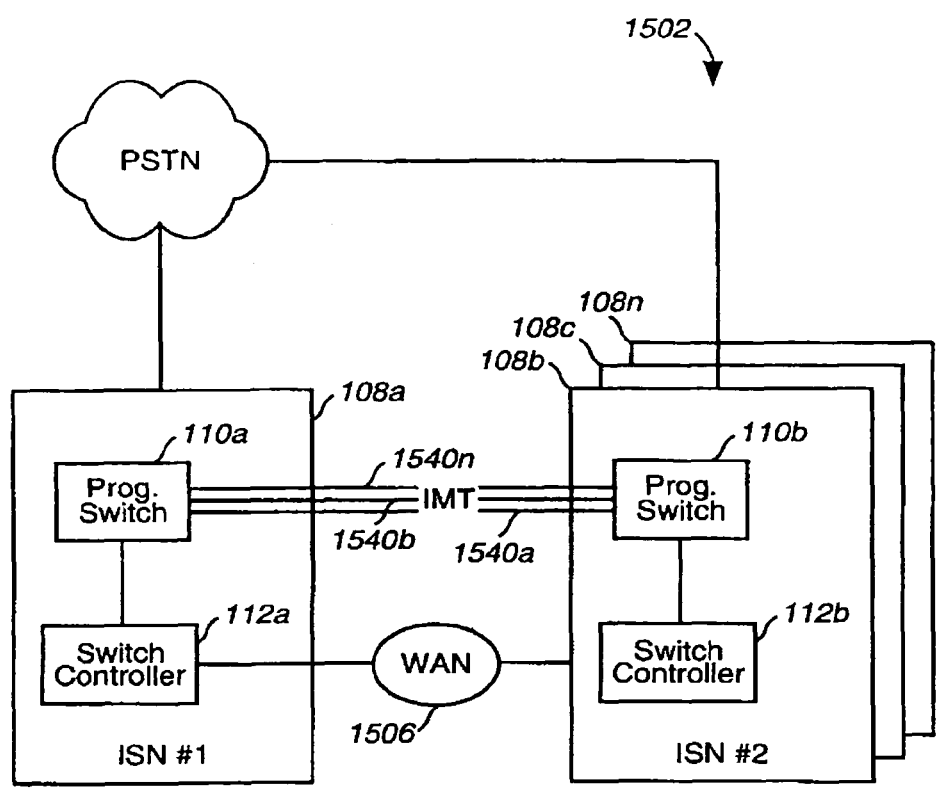
FIG. 15 is an interconnection of multiple intelligent service networks according to one embodiment of the present invention.

FIG. 15 illustrates the architecture of connecting programmable switches 110 at multiple ISNs 108. In this configuration. ISNs 108 are interconnected allowing them to serve as backups for each other improving network reliability. In addition, the configuration allows for transfer of calls between ISNs 108 without transferring via the PSTN 106. One use of the architecture is to transfer calls when an ISN 108 is not in-service. For example, if ISN #1 108a functions as a call center operating from 8:00 am to 5:00 p.m., and ISN #2 108b functions as a call center operating 24 hours a day, 7 days a week, calls can route from the PSTN 106 to ISN#1 108a at all hours of the day. The switch controller 112a at ISN #1 108a is programmed to transfer calls received between 5:00 p.m. and 8 a.m. to ISN #2 108b.

Exemplary programmable switch 110a is interconnected to a second exemplary programmable switch 110b via IMTs 1504a, 1504b, . . . 1504n. The IMT interconnection between the programmable switches 110 may be a mesh configuration or any other configuration that provides connectivity. The IMT interconnection between the programmable switches 110 provides the circuit connections needed for routing voice traffic among the ISNs 108.

Alternatively, the switch controllers 112 can be interconnected and the control of the calls can be managed among the ISNs 108 and the voice data transferred via the PSTN 106. Exemplary switch controller 112a is interconnected to exemplary switch controller 112b via a WAN 1506. The interconnection between the switch controllers 112 provides management and control capability between the ISNs 108 and allows for signaling call transfers.

While various embodiments of the present invention have been described above, it should be understood that they have been presented by way of example only, not limitation. Thus the breadth and scope of the present invention should not be limited by any of the above-described exemplary embodiments, but should be defined only in accordance with the following claims and their equivalents.

What is claimed is:

1. A system comprising:
a programmable switch connected to a public telephony network external to the system to provide switching capabilities via ports of the programmable switch for access between the system and the public telephony network, wherein the ports of the programmable switch terminate at intelligent peripheral resources; and
a switch controller coupled to the programmable switch and configured to transmit commands to control the programmable switch in providing enhanced service functionality using one or more of the intelligent peripheral resources,
wherein the commands include one command instructing the programmable switch to transmit an address complete message to the public telephony network via one of the ports of the programmable switch,
wherein the switch controller is further configured to (i) execute a service logic program to queue and route an enhanced service call switched from the public telephony network to the system, (ii) allocate resources and determine whether there is at least one port of the programmable switch terminating at an intelligent peripheral resource supporting the enhanced service call, (iii) interface with an external management system, and (iv) determine whether an alternate programmable switch is available to facilitate establishment of the enhanced service call, when none of the ports terminates at an intelligent peripheral resource supporting the enhanced service call, and
wherein the one command is sent in response to the enhanced service call.

2. A system of claim 1, wherein the switch controller is further configured to selectively establish a connection between some of the ports on the programmable switch based, at least in part, on characteristic of the intelligent peripheral resources.

3. A system of claim 1, wherein the programmable switch includes a digital exchange, and
wherein the switch controller is further configured to accommodate scaling of the system upon provisioning of one or more other programmable switches and configuring ports of the other programmable switches.

4. A system of claim 1, further comprising:
an intelligent service network component coupled to the switch controller and configured to interface with an external network.

5. A system of claim 4, wherein the intelligent service network component includes an operator console, an automated response unit, a service switching control point, a protocol converter, a network information distribution system database coupled to the switch controller via a network information distribution system server, an applications database, a data distribution system database, or a mainframe database.

6. A method comprising:
receiving, at a switch controller, a service request message, from a programmable switch, requesting service in response to a call switched from a public telephony network;
generating a command message instructing the programmable switch to send an address complete message to the public telephony network;
determining whether the switch controller has an available port on an intelligent service network component;
generating a transmission control message for forwarding to the intelligent service network component to establish a circuit for the call, if the switch controller is determined to have an available port; and
determining whether an alternate programmable switch is available to facilitate establishment of the circuit for the call, if the switch controller is determined to not have an available port.

7. A method of claim 6, further comprising:
generating a message instructing the programmable switch to play a tone and to connect the circuit.

8. A method of claim 6, further comprising:
receiving a termination signal initiated by a calling device that is connected to the public telephony network, the termination signal indicating that the call is being terminated;
notifying the intelligent service network component that the established call is being terminated; and
generating a command message to instruct the programmable switch to release the call.

9. A method of claim 6, wherein the termination signal includes either a release signal, a suspend signal, or a reorigination signal.

10. A method of claim 6, further comprising:
determining whether the call is a conference call; and
determining type of the conference call, if the call is determined to be a conference call.

11. A method of claim 6, further comprising:
generating a message requesting the programmable switch or the alternate programmable switch to send an answer message.

12. An apparatus comprising:
at least one processor; and
at least one memory including computer program code for one or more programs,
the at least one memory and the computer program code configured to, with the at least one processor, cause the apparatus to perform at least the following,
receive, at a switch controller, a service request message, from a programmable switch, requesting service in response to a call switched from a public telephony network;
generate a command instructing the programmable switch to send an address complete message to the public telephony network;
determine whether the switch controller has an available port on an intelligent service network component;
generate a transmission control message for forwarding to the intelligent service network component to establish a circuit for the call, if the switch controller is determined to have an available port; and
determine whether an alternate programmable switch is available to facilitate establishment of the circuit for the call, if the switch controller is determined to not have an available port.

13. An apparatus of claim 12, wherein the apparatus is further caused to:
generate a message instructing the programmable switch to play a tone and to connect the circuit.

14. An apparatus of claim 12, wherein the apparatus is further caused to:
receive a termination signal initiated by a calling device that is connected to the public telephony network, the termination signal indicating that the call is being terminated;

notify the intelligent service network component that the established call is being terminated; and generate a command message to instruct the programmable switch to release the call.

15. An apparatus of claim 12, wherein the termination signal includes either a release signal, a suspend signal, or a reorigination signal.

16. An apparatus of claim 12, wherein the apparatus is further caused to:

determine whether the call is a conference call; and determine type of the conference call, if the call is determined to be a conference call.

17. An apparatus of claim 12, wherein the apparatus is further caused to:

generate a message requesting the programmable switch or the alternate programmable switch to send an answer message.

* * * * *